US011541715B2

(12) United States Patent
Huang et al.

(10) Patent No.: US 11,541,715 B2
(45) Date of Patent: Jan. 3, 2023

(54) INTEGRATED THERMAL MANAGEMENT SYSTEMS AND ASSOCIATED THERMAL CONTROL METHODS FOR ELECTRIFIED VEHICLES

(71) Applicant: FORD GLOBAL TECHNOLOGIES, LLC, Dearborn, MI (US)

(72) Inventors: Daniel C. Huang, Rochester Hills, MI (US); Sunil Katragadda, Canton, MI (US); Ravi Gopal, Novi, MI (US); Clay Wesley Maranville, Ypsilanti, MI (US); Christopher Mark Greiner, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 272 days.

(21) Appl. No.: 17/038,253

(22) Filed: Sep. 30, 2020

(65) Prior Publication Data

US 2022/0097475 A1   Mar. 31, 2022

(51) Int. Cl.
*B60H 1/00* (2006.01)
*B60H 1/32* (2006.01)
*B60H 1/06* (2006.01)

(52) U.S. Cl.
CPC ..... *B60H 1/00007* (2013.01); *B60H 1/00278* (2013.01); *B60H 1/00392* (2013.01);
(Continued)

(58) Field of Classification Search
CPC ............ B60H 1/00007; B60H 1/00278; B60H 1/00392; B60H 1/00457; B60H 1/06; B60H 1/3208; B60H 1/3228; B60H 1/00571; B60H 1/00885; B60H 2001/00307; B60K 11/02; B60K 11/04; B60K 17/351; B60K 17/356; B60K 2001/001; B60K 2001/003; B60K 2001/0438; B60K 2001/005; B60K 2001/006; B60K 1/04; B60K 1/00; B62D 21/17

See application file for complete search history.

(56) References Cited

U.S. PATENT DOCUMENTS

| 10,486,494 B2 | 11/2019 | Koberstein et al. |
| 2005/0061497 A1 | 3/2005 | Amaral et al. |

(Continued)

FOREIGN PATENT DOCUMENTS

| CN | 1608013 A | * | 4/2005 | ............ B60G 13/14 |
| CN | 206287788 U | * | 6/2017 | |

(Continued)

*Primary Examiner* — Emmanuel E Duke
(74) *Attorney, Agent, or Firm* — David B. Kelley; Carlson, Gaskey & Olds, P.C.

(57) ABSTRACT

This disclosure details integrated thermal management systems for thermally managing electrified vehicle components. Exemplary integrated thermal management systems may include a thermal module assembly that may be integrated into a front end structure of a flexible modular platform of the electrified vehicle. The integrated thermal management systems may be controlled in a plurality of distinct thermal control modes for thermal managing various subcomponents and for addressing various vehicle auxiliary loads (e.g., passenger cabin heating loads, passenger cabin cooling loads, etc.).

20 Claims, 33 Drawing Sheets

(52) U.S. Cl.
CPC ........... *B60H 1/00457* (2013.01); *B60H 1/06* (2013.01); *B60H 1/3208* (2013.01); *B60H 1/3228* (2019.05)

(56) References Cited

U.S. PATENT DOCUMENTS

| | | | |
|---|---|---|---|
| 2008/0251235 A1* | 10/2008 | Zhou | B60L 50/51 165/59 |
| 2009/0145674 A1* | 6/2009 | Lee | B60L 50/16 333/182 |
| 2011/0000241 A1* | 1/2011 | Favaretto | B60H 1/00271 165/104.21 |
| 2014/0216709 A1* | 8/2014 | Smith | B60H 1/00392 165/41 |
| 2016/0107503 A1* | 4/2016 | Johnston | B60H 1/00278 165/202 |

FOREIGN PATENT DOCUMENTS

| | | | |
|---|---|---|---|
| CN | 206287788 U | | 6/2017 |
| CN | 207207681 U | | 4/2018 |
| CN | 110182017 | | 8/2019 |
| CN | 110422082 A | * | 11/2019 |
| JP | 2014037182 A | * | 2/2014 |
| JP | 2014037182 A | | 2/2014 |

\* cited by examiner

INTEGRATED THERMAL MANAGEMENT SYSTEMS AND ASSOCIATED THERMAL CONTROL METHODS FOR ELECTRIFIED VEHICLES

TECHNICAL FIELD

This disclosure relates to electrified vehicles, and more particularly to integrated thermal management systems for thermally managing various electrified vehicle components.

BACKGROUND

Electrified vehicles differ from conventional motor vehicles because they are selectively driven by one or more traction battery pack powered electric machines. The electric machines can propel the electrified vehicles instead of, or in combination with, an internal combustion engine.

Auxiliary loads, including cabin heating and cooling loads, account for a relatively large portion of the energy usage of plug-in battery powered electrified vehicles because of low waste heat energy. The increased energy usage required to meet the demand of the auxiliary loads can result in range reduction. Thermal management systems of plug-in battery powered electrified vehicles are often more complex than those of internal combustion engine powered vehicles.

SUMMARY

An electrified vehicle according to an exemplary aspect of the present disclosure includes, among other things, a flexible modular platform including a front end structure and a thermal module assembly mounted to the front end structure. The thermal module assembly includes an outside heat exchanger, a refrigerant system, a first manifold valve, and a second manifold valve.

In a further non-limiting embodiment of the foregoing electrified vehicle, the flexible modular platform includes an axle assembly that includes a pair of drive wheels and an electric machine configured to apply a rotational output torque to the axle assembly for driving the pair of drive wheels.

In a further non-limiting embodiment of either of the foregoing electrified vehicles, the front end structure is connected to a structural frame of the flexible modular platform, and further wherein the structural frame includes a plurality of rail members that include hollow passages.

In a further non-limiting embodiment of any of the forgoing electrified vehicles, a plurality of coolant lines are integrated within the hollow passages. At least a portion of the plurality of coolant lines are fluidly connected to the first manifold valve or the second manifold valve of the thermal module assembly.

In a further non-limiting embodiment of any of the forgoing electrified vehicles, the outside heat exchanger is a radiator received between upright frame members of the front end structure. The radiator is positioned adjacent to a bumper rail of the front end structure.

In a further non-limiting embodiment of any of the forgoing electrified vehicles, the radiator includes a indented surface that accommodates a shape of the bumper rail.

In a further non-limiting embodiment of any of the forgoing electrified vehicles, the thermal module assembly is part of an integrated thermal management system of the electrified vehicle.

In a further non-limiting embodiment of any of the forgoing electrified vehicles, a coolant system of the integrated thermal management system includes the outside heat exchanger, the first manifold valve, the second manifold valve, a heater core, a cooler core, a traction battery pack heat exchanger, and an electric motor heat exchanger.

In a further non-limiting embodiment of any of the forgoing electrified vehicles, the refrigerant system includes a compressor, a condenser, a thermal expansion valve, and a chiller.

In a further non-limiting embodiment of any of the forgoing electrified vehicles, a coolant of the coolant system exchanges heat with a refrigerant of the refrigerant system within the condenser and the chiller.

In a further non-limiting embodiment of any of the forgoing electrified vehicles, the first manifold valve and the second manifold valve are each eight-way valves.

An integrated thermal management system for an electrified vehicle according to another exemplary aspect of the present disclosure includes, among other things, a refrigerant system and a coolant system. The refrigerant system is configured to circulate a refrigerant and includes a first refrigerant-to-coolant heat exchanger and a second refrigerant-to-coolant heat exchanger. The coolant system is configured to circulate a coolant through the first refrigerant-to-coolant heat exchanger, the second refrigerant-to-coolant heat exchanger, or both for exchanging heat with the refrigerant based on a thermal control mode of the integrated thermal management system. A first circuit of the coolant system is configured to receive a first portion of the coolant for thermally managing a first electrified vehicle component. A second circuit of the coolant system is configured to receive a second portion of the coolant for thermally managing a second electrified vehicle component. A third circuit of the coolant system is configured to receive a third portion of the coolant for addressing a first auxiliary load of the electrified vehicle. A fourth circuit of the coolant system is configured to receive a fourth portion of the coolant for addressing a second auxiliary load of the electrified vehicle. A control unit is configured to selectively control a flow of each of the first portion, the second portion, the third portion, and the fourth portion of the coolant based on the thermal control mode.

In a further non-limiting embodiment of the foregoing system, the first electrified vehicle component is a traction battery pack, the second electrified vehicle component is a power electronics module, the first auxiliary load is a passenger cabin heating load, and the second auxiliary load is a passenger cabin cooling load.

In a further non-limiting embodiment of either of the foregoing systems, the traction battery pack includes a first internal cooling circuit for receiving the first portion of the coolant, and the power electronics component includes an electric machine including a second internal cooling circuit for receiving the second portion of the coolant.

In a further non-limiting embodiment of any of the foregoing systems, the first refrigerant-to-coolant heat exchanger is a condenser and the second refrigerant-to-coolant heat exchanger is a chiller. The refrigerant system includes a compressor and a thermal expansion valve.

In a further non-limiting embodiment of any of the foregoing systems, the coolant system includes a radiator, a first manifold valve, a second manifold valve, a heater core that is part of the third circuit, and a cooler core that is part of the fourth circuit.

In a further non-limiting embodiment of any of the foregoing systems, the first manifold valve is fluidly connected to the first circuit and the fourth circuit, and the second manifold valve is fluidly connected to the second circuit and the third circuit.

In a further non-limiting embodiment of any of the foregoing systems, the radiator, the first manifold valve, the second manifold valve, and the refrigerant system establish a thermal module assembly that is integrated into a front end structure of a flexible modular platform of the electrified vehicle.

In a further non-limiting embodiment of any of the foregoing systems, an integrated coolant line of a structural frame of the flexible module platform is fluidly connected to the thermal module assembly.

In a further non-limiting embodiment of any of the foregoing systems, the first electrified vehicle component includes a traction battery pack and a computer system.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details integrated thermal management systems for thermally managing electrified vehicle components. Exemplary integrated thermal management systems may include a thermal module assembly that may be integrated into a front end structure of a flexible modular platform of the electrified vehicle. The integrated thermal management systems may be controlled in a plurality of distinct thermal control modes for thermal managing various subcomponents and for addressing various vehicle auxiliary loads (e.g., passenger cabin heating loads, passenger cabin cooling loads, etc.). These and other features are discussed in greater detail in the following paragraphs of this detailed description.

Figure 1:
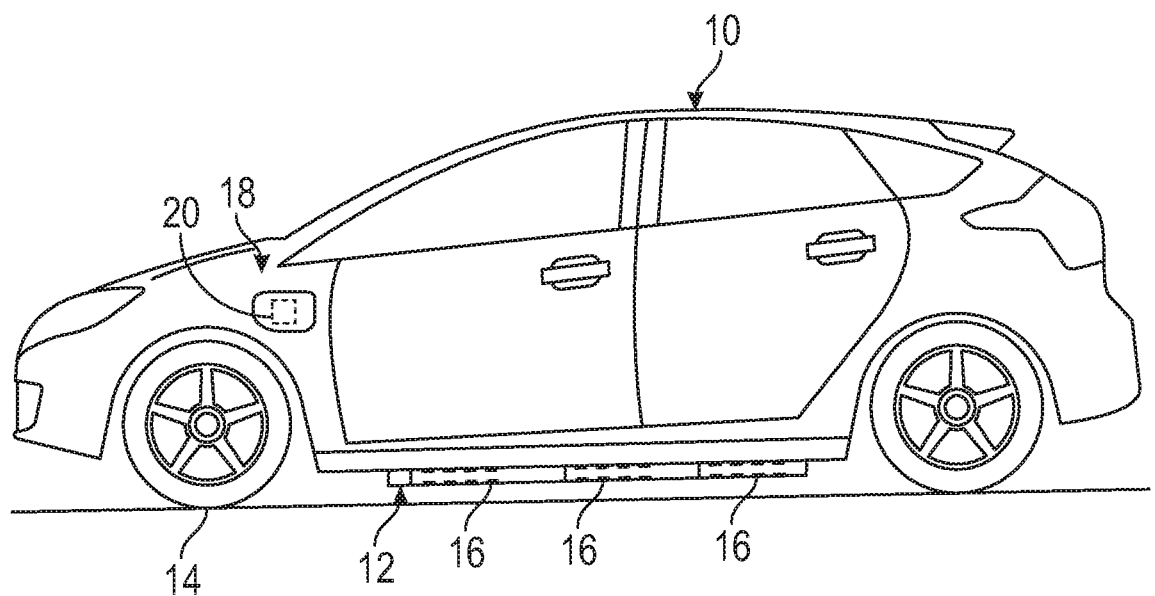
FIG. 1 is a side view of a plug-in electrified vehicle.

FIG. 1 illustrates an exemplary electrified vehicle 10 that includes a traction battery pack 12. The electrified vehicle 10 may include any electrified powertrain capable of applying a torque from an electric machine (e.g., an electric motor) for driving drive wheels 14 of the electrified vehicle 10. In an embodiment, the electrified vehicle is a battery electric vehicle (BEV). In another embodiment, the electrified vehicle 10 is a plug-in hybrid electric vehicle (PHEV). Therefore, the electric powertrain may electrically propel the drive wheels 14 either with or without the assistance of an internal combustion engine.

The electrified vehicle 10 of FIG. 1 is schematically illustrated as a car. However, the teachings of this disclosure may be applicable to any type of vehicle, including but not limited to, cars, trucks, vans, sport utility vehicles (SUVs), etc.

Although shown schematically, the traction battery pack 12 may be a high voltage traction battery pack that includes one or more battery arrays 16 (i.e., battery assemblies or groupings of battery cells) capable of outputting electrical power to one or more electric machines of the electrified vehicle 10. Other types of energy storage devices and/or output devices may also be used to electrically power the electrified vehicle 10.

From time to time, charging the energy storage devices of the traction battery pack 12 may be required or desirable. The electrified vehicle 10 may therefore be equipped with a charge port assembly 18 (sometimes referred to as a vehicle inlet assembly) for charging the energy storage devices (e.g., battery cells) of the traction battery pack 12. The charge port assembly 18 includes an inlet port 20 configured to receive electric vehicle supply equipment (EVSE) for operably connecting the electrified vehicle 10 to an external power source (e.g., grid power) for transferring power therebetween. The inlet port 20 may be configured to receive AC power, DC power, or both.

Figure 2:
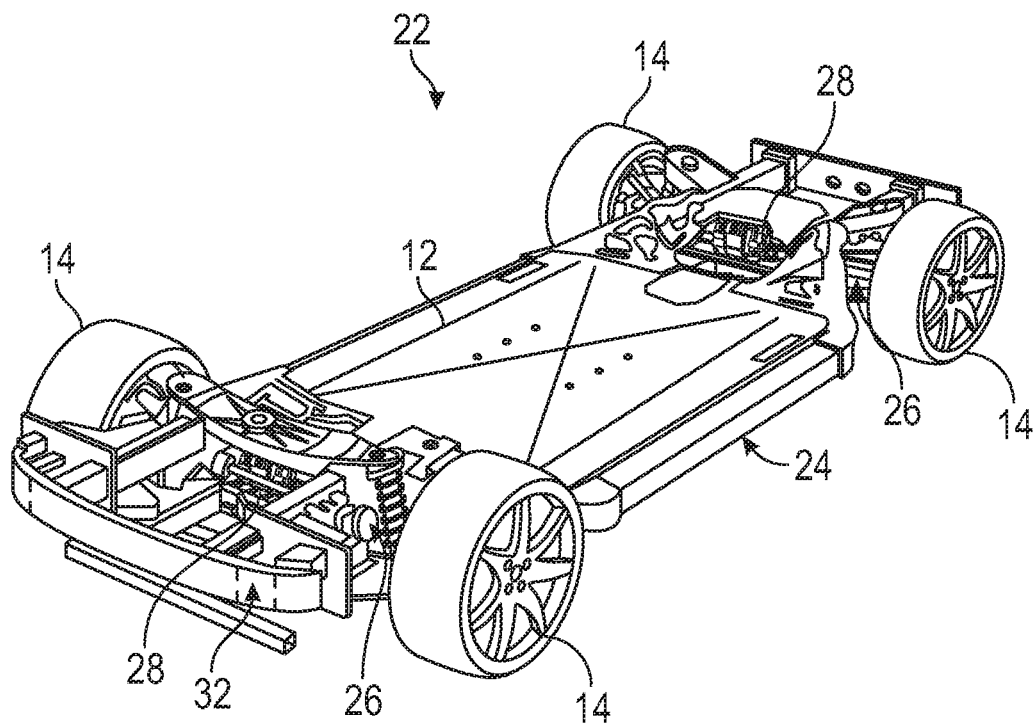
FIG. 2 illustrates a flexible modular platform of the electrified vehicle of FIG. 1.

FIG. 2 illustrates a flexible modular platform 22 of the electrified vehicle 10 of FIG. 1. The flexible modular platform 22, which is sometimes referred to as a skateboard, establishes an electrified powertrain drive system for electrically propelling the electrified vehicle 10. The flexible modular platform 22 may include a structural frame 24 that supports various electric drive components of the electrified vehicle 10. The structural frame 24 may support, among various other components, the traction battery pack 12, a pair of axle assemblies 26 that each carry two drive wheels 14, and one or more electric machines 28.

One axle assembly 26 of the flexible modular platform 22 may be configured as a front axle assembly and the other axle assembly 26 of the flexible modular platform 22 may be configured as a rear axle assembly of the electrified vehicle 10. One or more electric machines 28 may be operably connected to at least one of the axle assemblies 26. Therefore, the electrified vehicle 10 could be configured as a front wheel drive vehicle, a rear wheel drive vehicle, or an all-wheel drive vehicle. The electric machine(s) 28 may function as an electric motor, an electric generator, or both. Each electric machine 28 may be part of a power electronics module that also includes a charger, DC-DC converter, a motor controller (inverter), etc. During operation, the electric machine(s) 28 receives electrical power from the traction battery pack 12 and provides a rotational output torque to its respective axle assembly 26 for driving the drive wheels 14.

Due to a highly efficient energy conversion ratio between the traction battery pack 12 to the electric machine 28, the amount of waste heat energy produced by the flexible modular platform 22 of the electrified vehicle 10 may be relatively low. Hence, auxiliary loads, including but not limited to passenger cabin heating and cooling, may account for a relatively large portion of the energy usage of the traction battery pack 12. This disclosure therefore details low cost and efficient integrated thermal management systems of reduced complexity for thermally managing various subcomponents of the electrified vehicle 10 while also avoiding a significant range reduction by recovering and repurposing the low grade, low temperature waste heat from the traction battery pack 12 and related power electronics.

Figure 3:
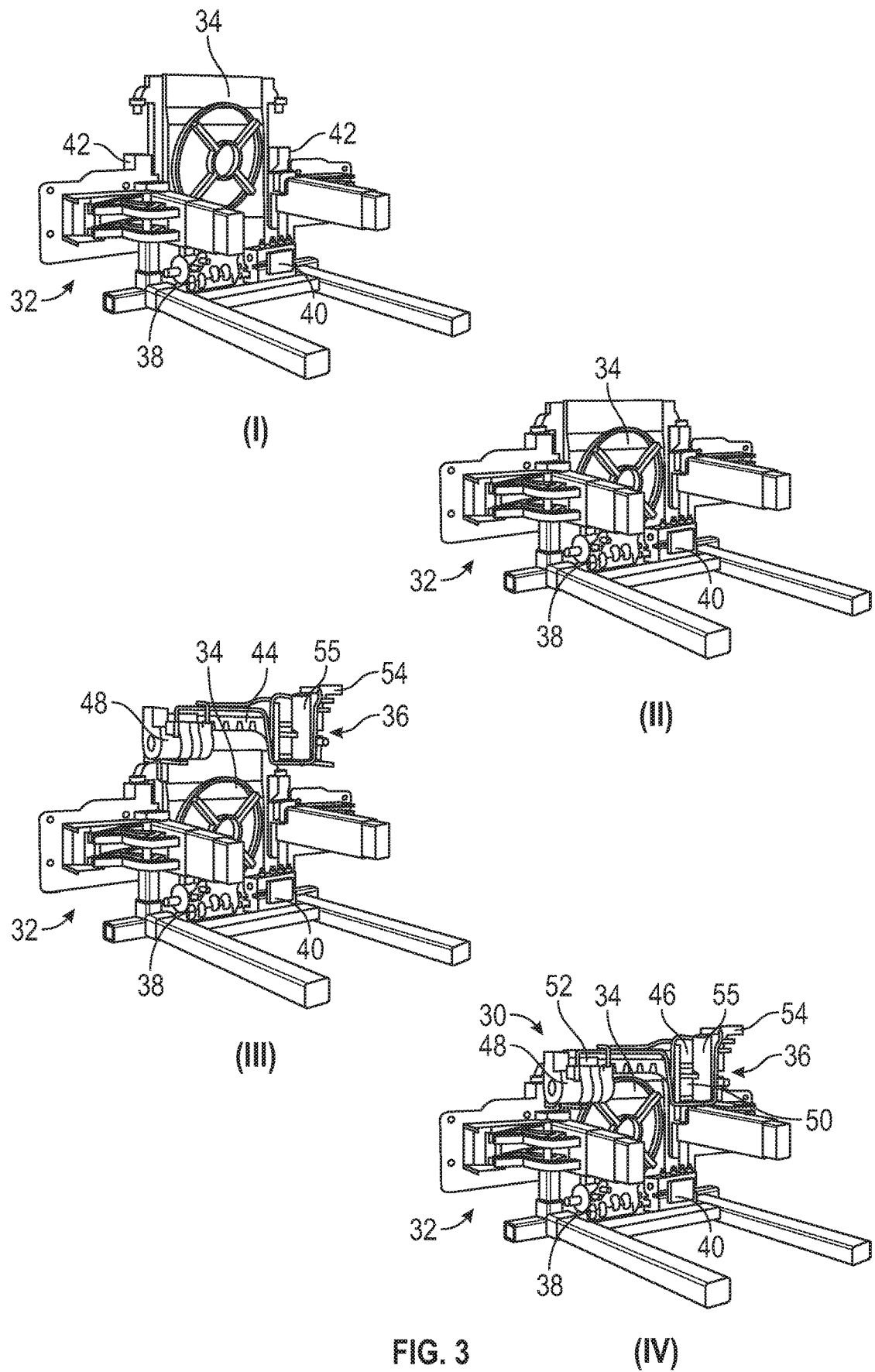
FIG. 3 schematically illustrates a method of assembling a front end assembly of the flexible module platform of FIG. 2.

Referring to FIG. 3, a thermal module assembly 30 (see image (iv)) may be incorporated into the flexible modular platform 22 of the electrified vehicle 10. In an embodiment, the thermal module assembly 30 is mounted to or otherwise supported by a front end structure 32 of the structural frame 24 of the flexible modular platform 22. The thermal module assembly 30 may include a radiator 34 (e.g., an outside heat exchanger), a refrigerant system 36, a first or cold side manifold valve 38, and a second or hot side manifold valve 40.

An exemplary assembly process for installing the thermal module assembly 30 on the front end structure 32 is schematically depicted by FIG. 3. First, the radiator 34 may be installed on the front end structure 32 (see images (i) and (ii)). The radiator 34 may be received between adjacent upright frame members 42 of the front end structure 32. The first manifold valve 38 and the second manifold valve 40 may be mounted to any surface of the front end structure 32 either before or after installing the radiator 34 within the front end structure 32. In an embodiment, the first and second manifold valves 38, 40 are each fluidly connected to the radiator 34.

Figure 4:
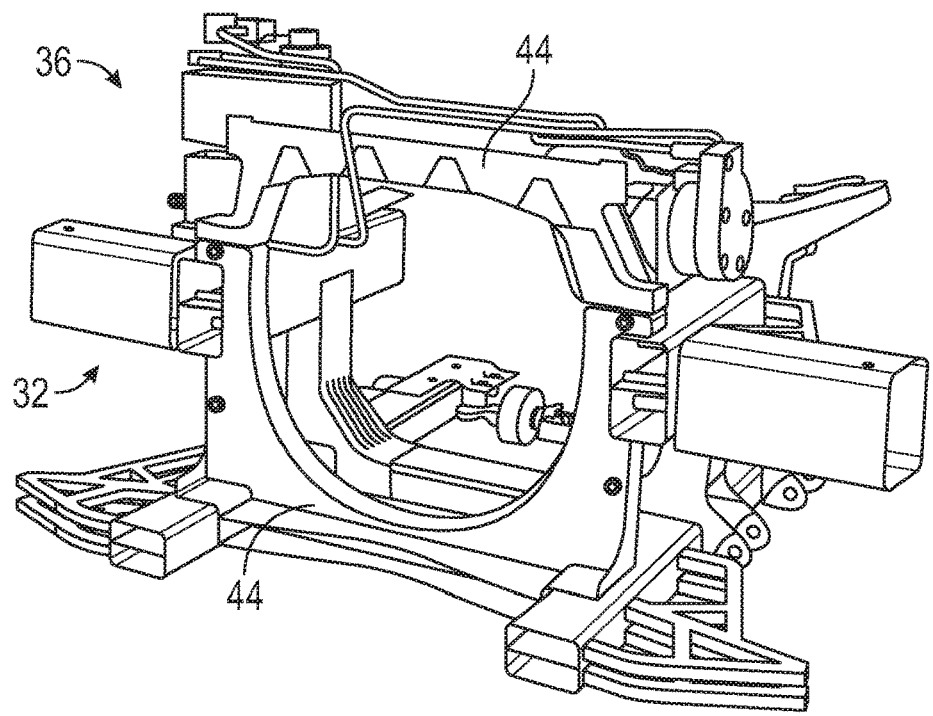
FIG. 4 illustrates exemplary thermal module support components of the front end assembly of FIG. 3.

Next, the refrigerant system 36 may be installed on the radiator 34 (see image (iii)). One or more support components 44 may be utilized to support the radiator 34, the refrigerant system 36, or both relative to the front end structure 32 (see FIG. 4).

As discussed in greater detail below, the refrigerant system 36 may include a condenser 46, a compressor 48, a chiller 50, a thermal expansion valve 52, and an accumulator 55. In an embodiment, the refrigerant system 36 is a compact, pre-charged system that consolidates refrigerant lines and components to the front of the electrified vehicle 10 without routing the refrigerant lines through the vehicle passenger cabin. As a pre-charged system, the refrigerant system 36 does not require charging during vehicle assembly.

The thermal module assembly 30 may additionally include a degas bottle 54. In an embodiment, the degas bottle 54 is secured to the refrigerant system 36.

The fully assembled thermal module assembly 30 is depicted in image (iv) of FIG. 3. Integrating the thermal module assembly 30 into the flexible modular platform 22 in the above described manner enables a self-propelled electric drive architecture that may be propelled on the manufacturing floor during vehicle assembly.

Figure 5:
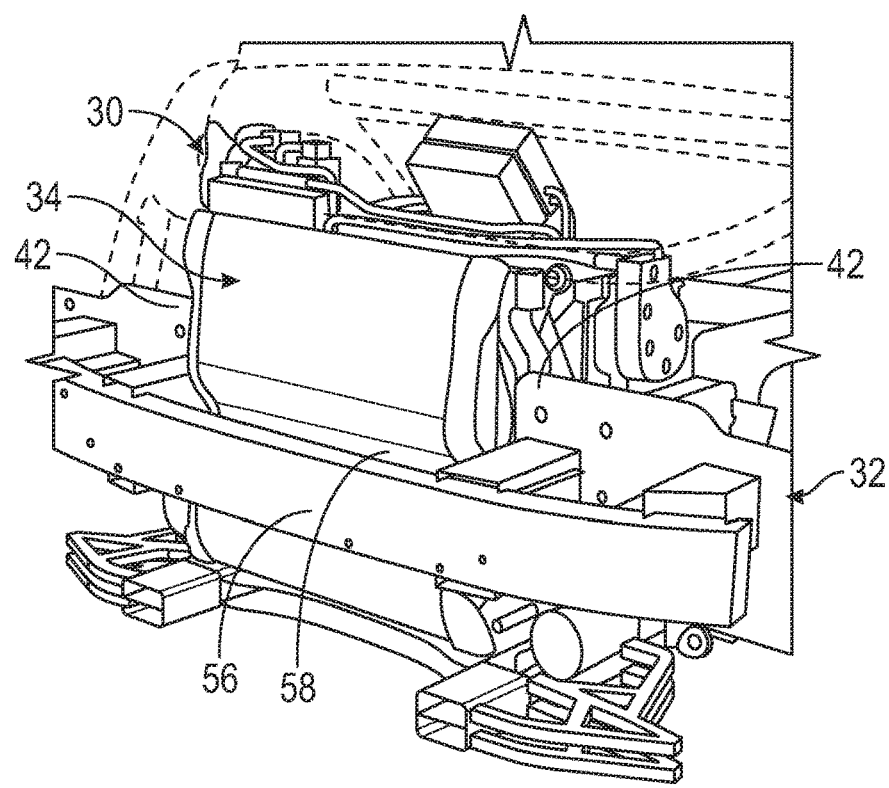
FIG. 5 illustrates an exemplary outdoor heat exchanger of the front end assembly of FIG. 3.

Referring now to FIG. 5, the radiator 34 of the thermal module assembly 30 may be packaged between the upright frame members 42 and a bumper rail 56 that may be secured to the front end structure 32. The radiator 34 may include a shape that is optimized for improving airflow and enabling improved front end styling of reduced weight. For example, the radiator 34 may be designed to include an indented surface 58 that better accommodates the shape of the bumper rail 56. In an embodiment, the radiator 34 is an additively manufactured component of the thermal module assembly 30.

Figure 6:
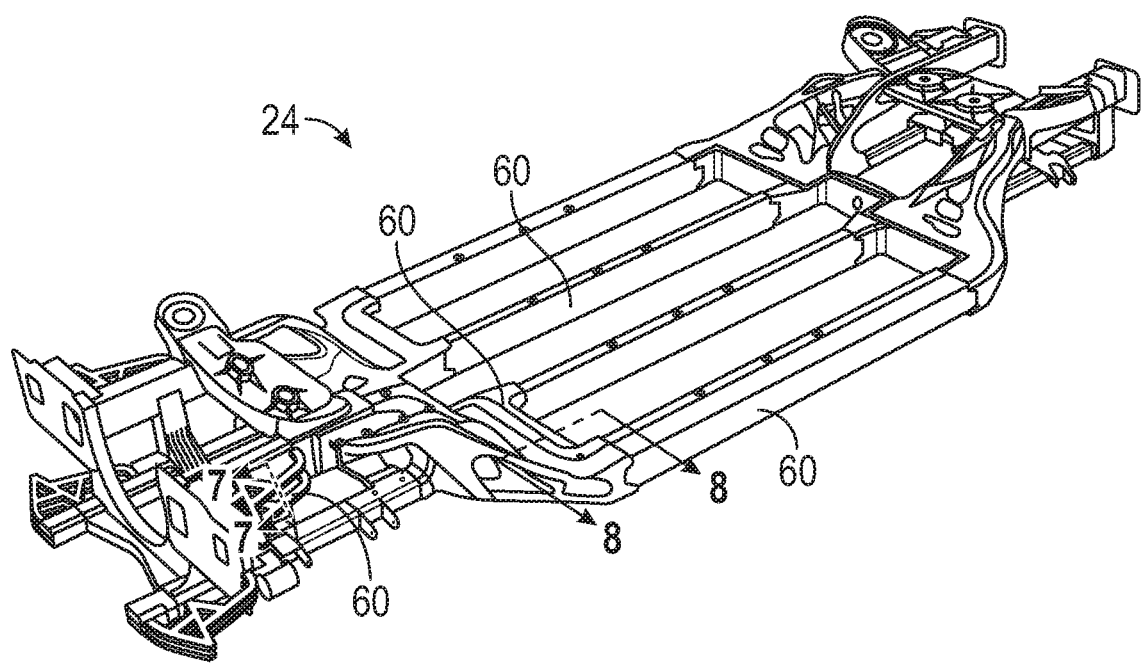
FIG. 6 illustrates a frame structure of the flexible modular platform of FIG. 2.

Additional aspects of the structural frame 24 of the flexible modular platform 22 are illustrated with reference to FIGS. 6-8. The structural frame 24 may include a plurality of rail members 60. The rail members 60 may embody various sizes and shapes. In an embodiment, at least a portion of the rail members 60 are extruded components of the structural frame 24. The rail members 60 may each include one or more hollow passages 62. Coolant lines 64 may be integrated into the hollow passages 62. In an embodiment, the coolant lines 64 include at least one hot coolant line and one cold coolant line.

Figure 7:
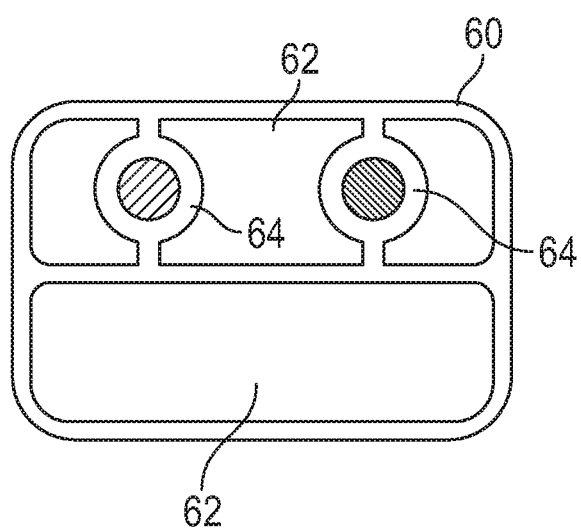
FIG. 7 is a cross-sectional view through section 7-7 of FIG. 6.
Figure 8:
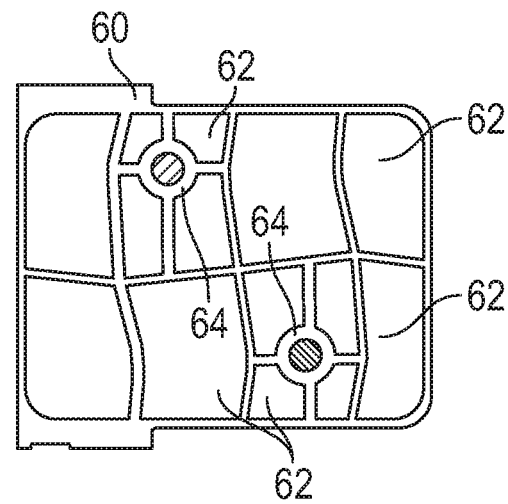
FIG. 8 is a cross-sectional view through section 8-8 of FIG. 6.

FIGS. 7 and 8 illustrate exemplary embodiments for arranging coolant lines 64 within the hollow passages 62 of the rail members 60. As illustrated, the coolant lines 64 could be incorporated within the same hollow passages 62 (see FIG. 7) or within different hollow passages 62 (see FIG. 8). Of course, other configurations are also contemplated within the scope of this disclosure.

The coolant lines 64 may be fluidly connected to one or more components of the thermal module assembly 30. Therefore, the thermal module assembly 30 and the coolant lines 64 may together establish portions of an integrated thermal management system 66 (see FIG. 9) of the electrified vehicle 10.

Figure 9:
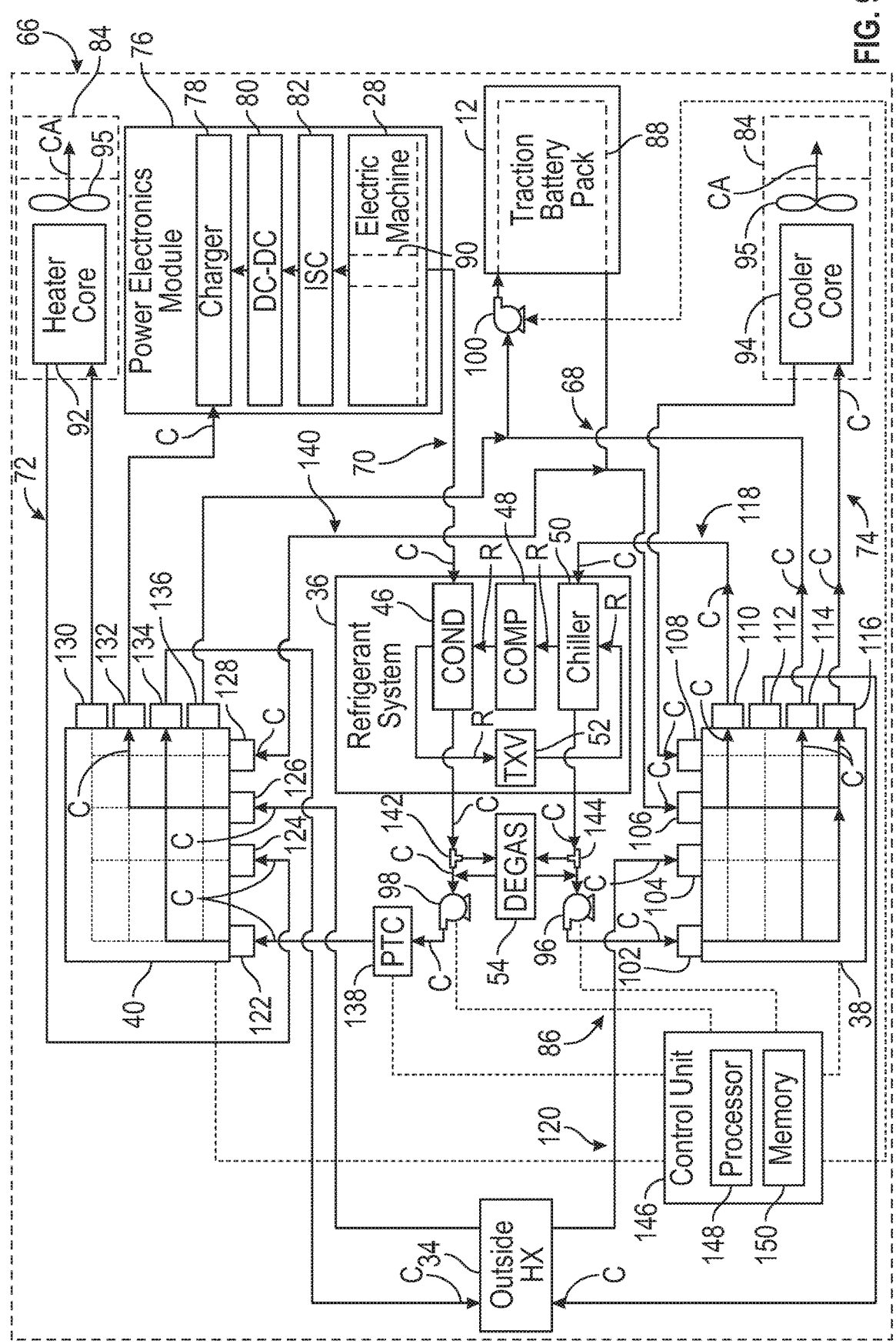
FIG. 9 schematically illustrates an integrated thermal management system for an electrified vehicle.

FIG. 9, with continued reference to FIGS. 1-8, schematically illustrates the exemplary integrated thermal management system 66 of the electrified vehicle 10. The integrated thermal management system 66 may be controlled to thermally manage various components or portions of the electrified vehicle 10, including but not limited to, a passenger cabin 84, the traction battery pack 12, and a power electronics module 76, which may include, for example, an electric machine 28, a charger 78, a DC-DC converter 80, an inverter system controller (ISC) 82, etc.

The integrated thermal management system 66 may include a coolant system 86 for circulating a coolant C and a refrigerant system 36 for circulating a refrigerant R. The thermal module assembly 30 of FIG. 3 may incorporate components from both systems and is therefore considered to be part of both the coolant system 86 and the refrigerant system 36 of the integrated thermal management system 66.

The coolant system 86 circulates the coolant C, such as water mixed with ethylene glycol or any other suitable coolant, to thermally manage the traction battery pack 12, and/or to thermally manage the power electronics module 76, and/or to deliver a conditioned airflow CA (e.g., heated or cooled airflow) to the passenger cabin 84. In an embodiment, the coolant C is circulated through an internal cooling circuit 88 of the traction battery pack 12 and through an internal cooling circuit 90 of the electric machine 28 for removing heat from these components in a convective heat transfer process, for example. The internal cooling circuits 88, 90 may be established by integrated heat exchangers of the traction battery pack 12 and the electric machine 28.

In another embodiment, the coolant C exchanges heat with an airflow that may be blown across a heater core 92 and/or a cooler core 94 (e.g., an evaporator) for delivering a heated and/or cooled conditioned airflow CA to the passenger cabin 84. The conditioned airflow CA may raise or lower the temperature inside the passenger cabin 84 or reduce the humidity therein. The airflow may be blown across the heater core 92 or the cooler core 94 by a blower fan 95. Although shown as being located at different locations from one another in FIG. 9, the heater core 92, the cooler core 94, and the blower fan 95 may be packaged together at a location inside the passenger cabin 84 as part of a heating, ventilation, and air conditioning (HVAC) module.

In an embodiment, the coolant system 86 includes at least the radiator 34, the first manifold valve 38, the second manifold valve 40, the heater core 92, the cooler core 94, a first pump 96, a second pump 98, and a third pump 100. Although only schematically shown, the various components of the coolant system 86 can be fluidly interconnected by various conduits or passages such as tubes, hoses, pipes, etc. The coolant lines 64 of the rail members 60 of the structural frame 24 of the flexible modular platform 22 may establish a least a portion of the fluid interconnections of the coolant system 86.

During operation of the coolant system 86, thermal energy may be transferred between the coolant C and the refrigerant R of the refrigerant system 36 within both the condenser 46 and the chiller 50 of the refrigerant system 36 in order to reduce the temperature of the coolant C. The condenser 46 and the chiller 50 therefore facilitate the transfer of thermal energy between the coolant system 86 and the refrigerant system 36.

The first pump 96, the second pump 98, and the third pump 100 are arranged to circulate the coolant C through various circuits of the coolant system 86. The first pump 96 may be positioned and configured to circulate the coolant C through the first manifold valve 38, the second pump 98 may be positioned and configured to circulate the coolant C through the second manifold valve 40, and the third pump 100 may be positioned and configured to circulate the coolant C through the internal cooling circuit 88 of the traction battery pack 12. However, the pumps 96, 98, and 100 could be located at other locations of the coolant system 86. Moreover, the coolant system 86 could employ a greater or fewer number of pumps within the scope of this disclosure.

The first manifold valve 38 may be a multi-position valve, such as an eight-way valve, for example, that may be controlled to selectively direct the coolant C along various paths for circulation within multiple circuits of the coolant system 86. The first manifold valve 38 may include a first inlet port 102, a second inlet port 104, a third inlet port 106, and a fourth inlet port 108, and a first outlet port 110, a second outlet port 112, a third outlet port 114, and a fourth outlet port 116. Portions of the coolant C may be directed to any of the outlet ports 110-116 from any of the inlet ports 102-108 within internal passages of the first manifold valve 38.

The first pump 96, the first inlet port 102, the first outlet port 110, and the chiller 50 may establish a chiller circuit 118 of the coolant system 86. The first outlet port 110 may be selectively opened to deliver a portion of the coolant C to the chiller 50. The temperature of the coolant C is reduced as it passes through the chiller 50 as a result of exchanging heat with the refrigerant R of the refrigerant system 36. Once chilled, the first pump 96 may pump the coolant C back to the first inlet port 102. The chilled coolant C may then be directed to one or more of the outlet ports 110-116 based on the current thermal loads of the electrified vehicle 10.

The second inlet port 104, the second outlet port 112, and the radiator 34 may establish an outside heat exchanger circuit 120 of the coolant system 86. The second outlet port 112 may be selectively opened to deliver a portion of the coolant C to the radiator 34. Thermal energy may be transferred from the coolant C to ambient air outside the electrified vehicle 10 within the radiator 34. For example, an airflow communicated across the radiator 34 may exchange heat with the coolant C as the two fluids flow across/through the radiator 34. The cooled coolant C may then be returned to the second inlet port 104 for communication to one or more of the outlet ports 110-116 based on the current thermal loads of the electrified vehicle 10.

The third inlet port 106, the third outlet port 114, the traction battery pack 12, and the third pump 100 may establish a first battery circuit 68 of the coolant system 86. The third outlet port 114 may be selectively opened to deliver a portion of the coolant C that has been cooled by the radiator 34, the chiller 50, or both to the internal cooling circuit 88 of the traction battery pack 12. The coolant C may remove heat from the traction battery pack 12 as it is circulated through the internal cooling circuit 88, thereby managing the thermal load of the traction battery pack 12. The third pump 100 may pump the coolant C through the first battery circuit 68.

The fourth inlet port 108, the fourth outlet port 116, and the cooler core 94 may establish a passenger cabin cooling circuit 74 of the coolant system 86. The fourth outlet port 116 may be selectively opened when cooling is demanded within the passenger cabin 84 to deliver a portion of the coolant C that has been cooled by the radiator 34, the chiller 50, or both to the cooler core 94. The coolant C is expanded in the cooler core 94 and thus absorbs heat from the airflow that is blown across the cooler core 94 by the blower fan 95. The airflow may then be communicated as conditioned airflow CA into the passenger cabin 84. The coolant C exiting the cooler core 94 may be returned to the fourth inlet port 108 of the first manifold valve 38.

The second manifold valve 40 may be a multi-position valve, such as another eight-way valve, for example, that may be controlled to selectively direct the coolant C along various paths for circulation within multiple additional circuits of the coolant system 86. The second manifold valve 40 may include a first inlet port 122, a second inlet port 124, a third inlet port 126, and a fourth inlet port 128, and a first outlet port 130, a second outlet port 132, a third outlet port 134, and a fourth outlet port 136. Portions of the coolant C may be directed to any of the outlet ports 130-136 from any of the inlet ports 122-128 within internal passages of the second manifold valve 40.

The second pump 98, the first inlet port 122, the second outlet port 132, the third inlet port 126, the third outlet port 134, the radiator 34, the power electronics module 76, and the condenser 46 may establish an e-drive circuit 70 of the coolant system 86. A portion of the coolant C that hast been cooled by the condenser 46 may be pumped to the first inlet port 122 by the second pump 98. The portion of the coolant C may then be communicated through the third outlet port 134, then to the radiator 34 for further cooling, and then back to the third inlet port 126. Alternatively, the e-drive circuit 70 could bypass the radiator 34. The second outlet port 132 may be selectively opened to deliver a portion of the coolant C through the power electronics module 76 for managing the thermal loads of the charger 78, the DC-DC converter 80, the ISC 82, and the electric machine 28. The coolant C may be circulated through the internal cooling circuit 90 of the electric machine 28. The coolant C exiting the power electronics module 76 may be returned to the condenser 46.

The second inlet port 124, the first outlet port 130, and the heater core 92 may establish a passenger cabin heating circuit 72 of the coolant system 86. The first outlet port 130 may be selectively opened when heating is demanded within the passenger cabin 84 to deliver a portion of the coolant C that has been warmed, such as a result of picking up heat from the power electronics module 76, to the heater core 92. The coolant C loses heat to the airflow that is blown across the heater core 92 by the blower fan 95. The airflow may then be communicated as conditioned airflow CA into the passenger cabin 84. The coolant C exiting the heater core 92 may be returned to the second inlet port 124 of the second manifold valve 40.

A positive temperature coefficient (PTC) heater 138 may be disposed between the second pump 98 and the first inlet port 122 of the second manifold valve 40. The PTC heater 138 may be selectively activated to heat the coolant C during situations that require the coolant C temperature to be increased (e.g., high heat demand within passenger cabin 84, etc.).

The fourth inlet port 128, the fourth outlet port 136, the traction battery pack 12, and the third pump 100 may establish a second battery circuit 140 of the coolant system 86. The fourth outlet port 136 may be selectively opened to deliver a portion of the coolant C from the second manifold valve 40 to the internal cooling circuit 88 of the traction battery pack 12. The coolant C may remove heat from the traction battery pack 12 as it is circulated through the internal cooling circuit 88, thereby managing the thermal load of the traction battery pack 12. The third pump 100 may pump the coolant C through the second battery circuit 140. The second battery circuit 140 may be employed for addressing lower thermal load requirements of the traction battery pack 12 compared to the first battery circuit 68, or could be employed in combination with the first battery circuit 68 to augment the cooling.

Although the various cooling circuits described above are shown as being connected to specific ports of the first and second manifold valves 38, 40, other configurations are further contemplated within the scope of this disclosure.

Portions of the coolant C exiting from either the condenser 46 or the chiller 50 may be periodically directed to the degas bottle 54 via a first T-joint 142 or a second T-joint 144, respectively. The degas bottle 54 allows entrained air and gasses in the coolant C to be separated from the coolant C as it flows through the degas bottle 54. The coolant C exiting the degas bottle 54 may be recombined with portions of the coolant C flowing to either the first manifold valve 38 or the second manifold valve 40.

The refrigerant system 36 of the integrated thermal management system 66 may include the compressor 48, the condenser 46, the thermal expansion valve 52, and the chiller 50. The compressor 48 pressurizes and circulates the refrigerant R through the refrigerant system 36. Thermal energy may be transferred between the refrigerant R and the coolant C within the condenser 46. The refrigerant R may then be communicated to the thermal expansion valve 52. The thermal expansion valve 52 is configured to change (e.g., reduce) the pressure of the refrigerant R prior to communicating the refrigerant R to the chiller 50. The refrigerant R passing to the chiller 50 may exchange heat with the coolant C passing through the chiller 50, thereby cooling the coolant C in order to prepare the coolant C for cooling the traction battery pack 12 and/or providing conditioned airflow CA to the passenger cabin 84 for cooling. The refrigerant R exiting the chiller 50 may then return to the compressor 48 and the conditioning cycle may repeat itself as part of a closed-loop system.

A control unit 146 may control operation of the integrated thermal management system 66. The control unit 146 could be a stand-alone control unit associated with the integrated thermal management system 66 or could be part of an overall vehicle control unit, such as a vehicle system controller (VSC) that includes a powertrain control unit, a transmission control unit, an engine control unit, a battery control module, etc. It should therefore be understood that the control unit 146 and one or more other controllers can collectively be referred to as a "control unit" that is configured to control, such as through a plurality of integrated algorithms, various actuators in response to signals from various inputs associated with the integrated thermal management system 66. The various controllers that make up the VSC can communicate with one another using a common bus protocol (e.g., CAN), for example.

In an embodiment, the control unit 146 is programmed with executable instructions for interfacing with and operating the various components of the integrated thermal management system 66 for thermally managing the heat generated by the traction battery pack 12 and/or the power electronics module 76, and/or for delivering conditioned airflow CA to the passenger cabin 84. The control unit 146 may include various inputs and outputs for interfacing with the various components of the integrated thermal management system 66, including but not limited to, the first manifold valve 38, the second manifold valve 40, the first pump 96, the second pump 98, the third pump 100, the PTC heater 138, and the compressor 48. The operable connection between the control unit 146 and these components is schematically illustrated in FIG. 9 by dashed lines. The control unit 146 may further include a processing unit 148 and non-transitory memory 150 for executing the various control strategies and modes of the integrated thermal management system 66.

The control unit 146 may be programmed to control the integrated thermal management system 66 in order to direct the coolant C within one or more of the circuits necessary for thermally managing a specific subcomponent or system during a given vehicle operating condition. In an embodiment, control unit 146 is capable of controlling the integrated thermal management system 66 in a plurality of distinct thermal control modes. Twenty-five exemplary thermal control modes that may be performed by the integrated thermal management system 66 are listed below in Table 1.

TABLE 1

EXEMPLARY THERMAL CONTROL MODES

| Mode | Use/Condition | Battery Equalization | Battery Passive Cooling | Battery Active Cooling | Battery Heating | Power Electronics (PE) Cooling | Cabin Cooling | Cabin Heating |
|---|---|---|---|---|---|---|---|---|
| 1 | Cold w/o occupants when charging | | x | | | x | | |
| 2 | Hot w/o occupants when charging | | | x | | x | | |
| 3 | Cold with occupant when charging | | x | | | x | | x |
| 4 | Hot with occupant when charging | | | x | | x | x | |
| 5 | Cold during plug-in | | | | x | | | |
| 6 | Hot during plug-in | | | x | | | | |
| 7 | Cold cabin preconditioning | | | | | | | x |
| 8 | Hot cabin preconditioning | | | | | | x | |
| 9 | Cold cabin and battery preconditioning | | | | x | | | x |
| 10 | Hot cabin and battery preconditioning | | | x | | | x | |
| 11 | PE + battery passive during drive cycle | | x | | | x | | |
| 12 | PE + battery active during drive cycle | | | x | | x | | |
| 13 | PE + battery active + cabin cooling during drive cycle | | | x | | x | x | |
| 14 | PE + battery equalization + cabin heating during drive cycle | x | | | | x | | x |
| 15 | PE + battery active + cabin heating during drive cycle | | | x | | x | | x |
| 16 | PE + battery equalization + cabin heating + dehumidification during drive cycle | x | | | | | x | x |
| 17 | PE + battery active + cabin heating + dehumidification during drive cycle | | | x | | x | x | x |

TABLE 1-continued

EXEMPLARY THERMAL CONTROL MODES

| Mode | Use/Condition | Battery Equalization | Battery Passive Cooling | Battery Active Cooling | Battery Heating | Power Electronics (PE) Cooling | Cabin Cooling | Cabin Heating |
|---|---|---|---|---|---|---|---|---|
| 18 | PE + battery heating + cabin heating + dehumidification during drive cycle | | | | x | x | x | x |
| 19 | PE cooling only during drive cycle | | | | | x | | |
| 20 | PE heat recovery + cabin heating during drive cycle | | | | | | | x |
| 21 | PE heat recovery + cabin heating + dehumidification during drive cycle | | | | | | x | x |
| 22 | Battery equalization | x | | | | | | |
| 23 | Battery passive cooling | | x | | | | | |
| 24 | Fault | | x | | | x | | |
| 25 | Battery passive cooling + PE heat recovery + Cabin PTC | | x | | | x | | |

FIGS. 10-34, with continued reference to FIGS. 1-9, schematically illustrate flow patterns of the coolant C within the integrated thermal management system 66 during each of the exemplary thermal control modes listed in Table 1. In these figures, solid lines are used to indicate coolant C that is "flowing to" one or more of the heat exchangers of the integrated thermal management system 66, and dashed lines are used to indicate coolant C that is "flowing out of" the one or more heat exchangers of the integrated thermal management system 66.

Figure 10:
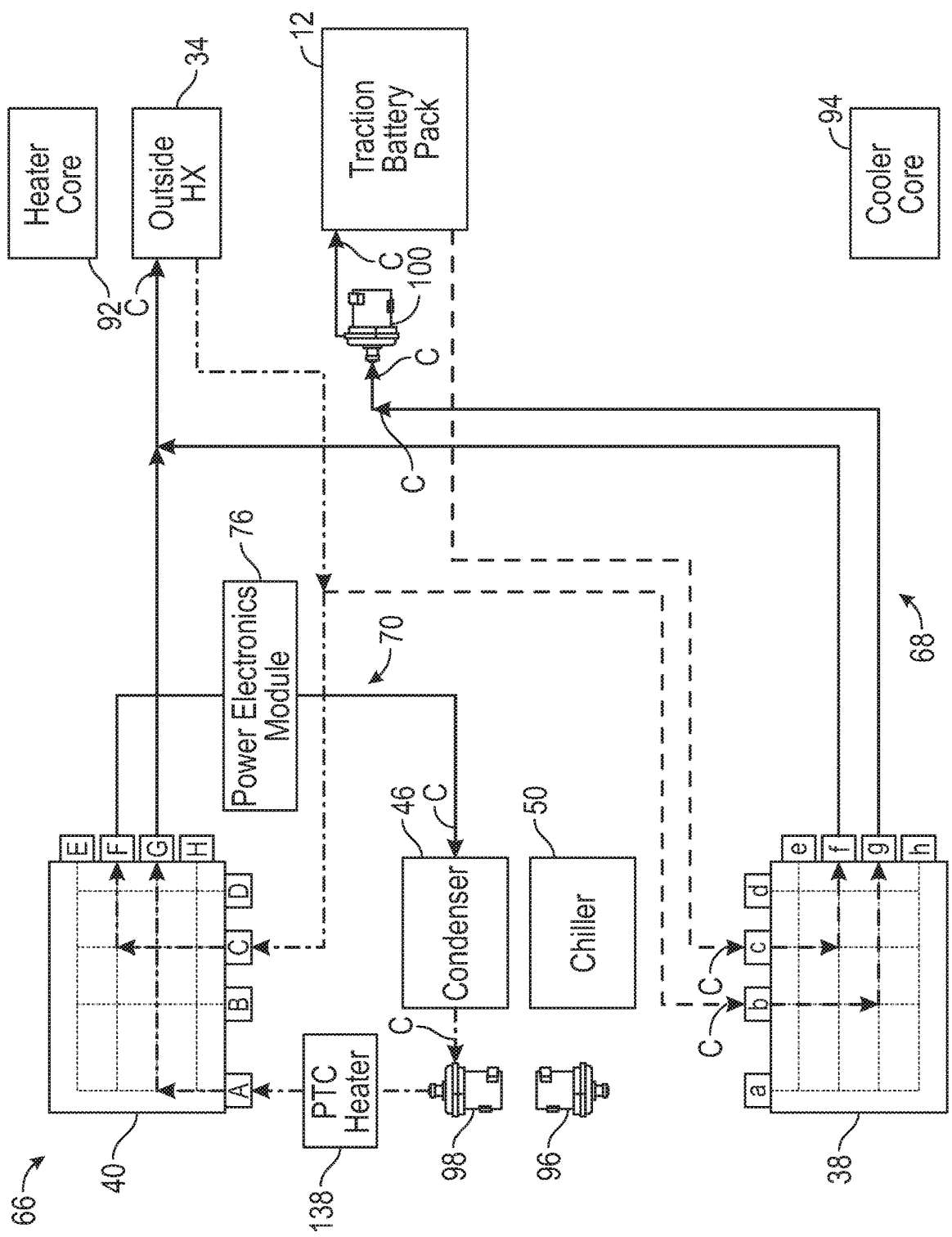
FIG. 10 schematically illustrates a first exemplary thermal control mode of an electrified vehicle integrated thermal management system.

FIG. 10 illustrates the first exemplary thermal control mode for passively cooling the traction battery pack 12 and for cooling the power electronics module 76 during mild/cold ambient conditions when charging the traction battery pack 12 without occupants within the passenger cabin 84. During this mode, coolant C is circulated through the first battery circuit 68 for thermally managing the traction battery pack 12 and through the e-drive circuit 70 (including through the radiator 34) for thermally managing the components of the power electronics module 76. The compressor 48 of the refrigerant system 36 is turned off during this thermal control mode and therefore the coolant C directed to the traction battery pack 12 is passively cooled using only the radiator 34.

Figure 11:
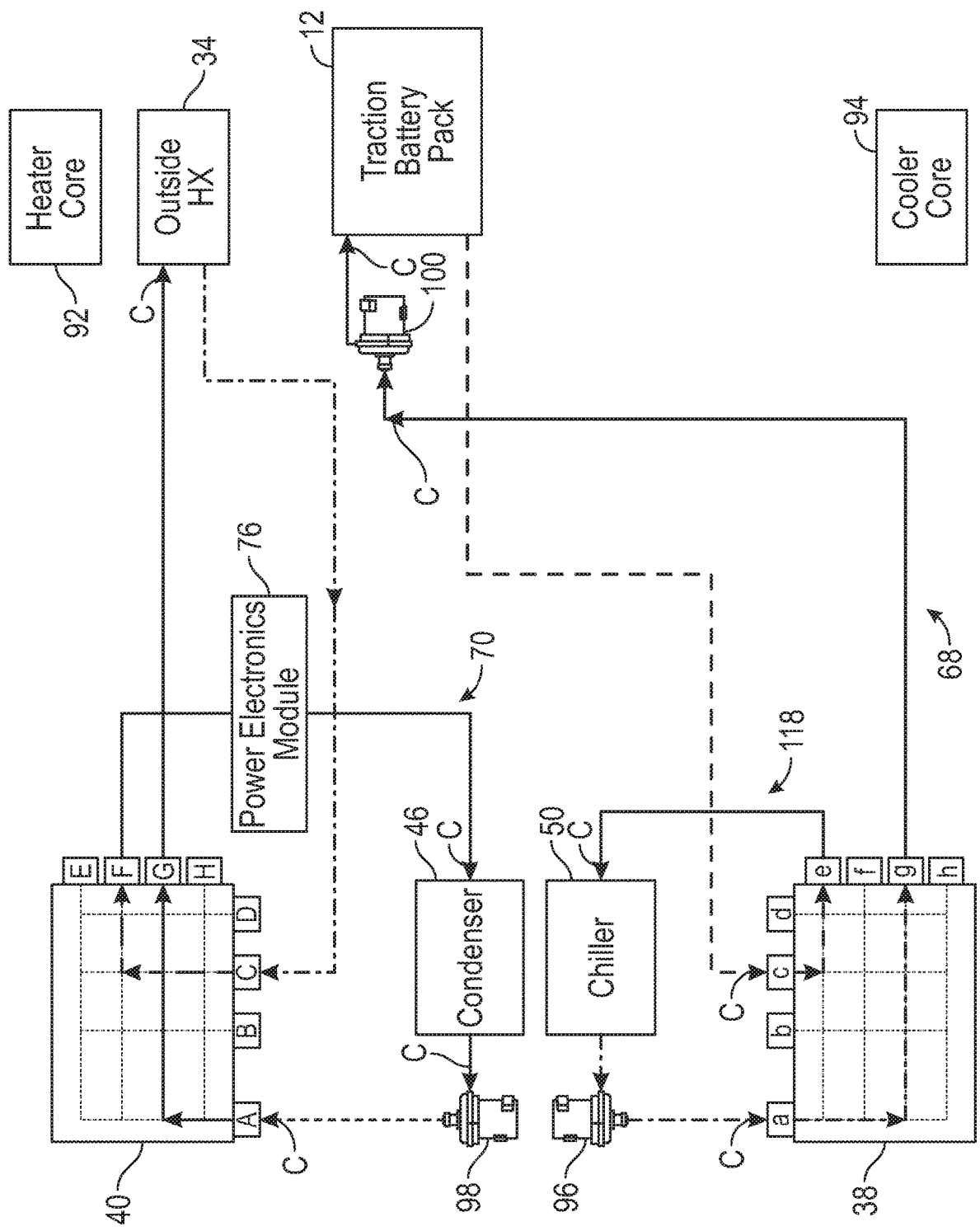
FIG. 11 schematically illustrates a second exemplary thermal control mode of an electrified vehicle integrated thermal management system.

FIG. 11 illustrates the second exemplary thermal control mode for actively cooling the traction battery pack 12 and for cooling the power electronics module 76 during hot ambient conditions when charging the traction battery pack 12 without occupants within the passenger cabin 84. During this mode, coolant C is circulated through the chiller circuit 118 and the first battery circuit 68 for thermally managing the traction battery pack 12 and through the e-drive circuit 70 for thermally managing the components of the power electronics module 76. The compressor 48 of the refrigerant system 36 is turned on during this thermal control mode and therefore the coolant C directed to the traction battery pack 12 is actively cooled by the chiller 50.

Figure 12:
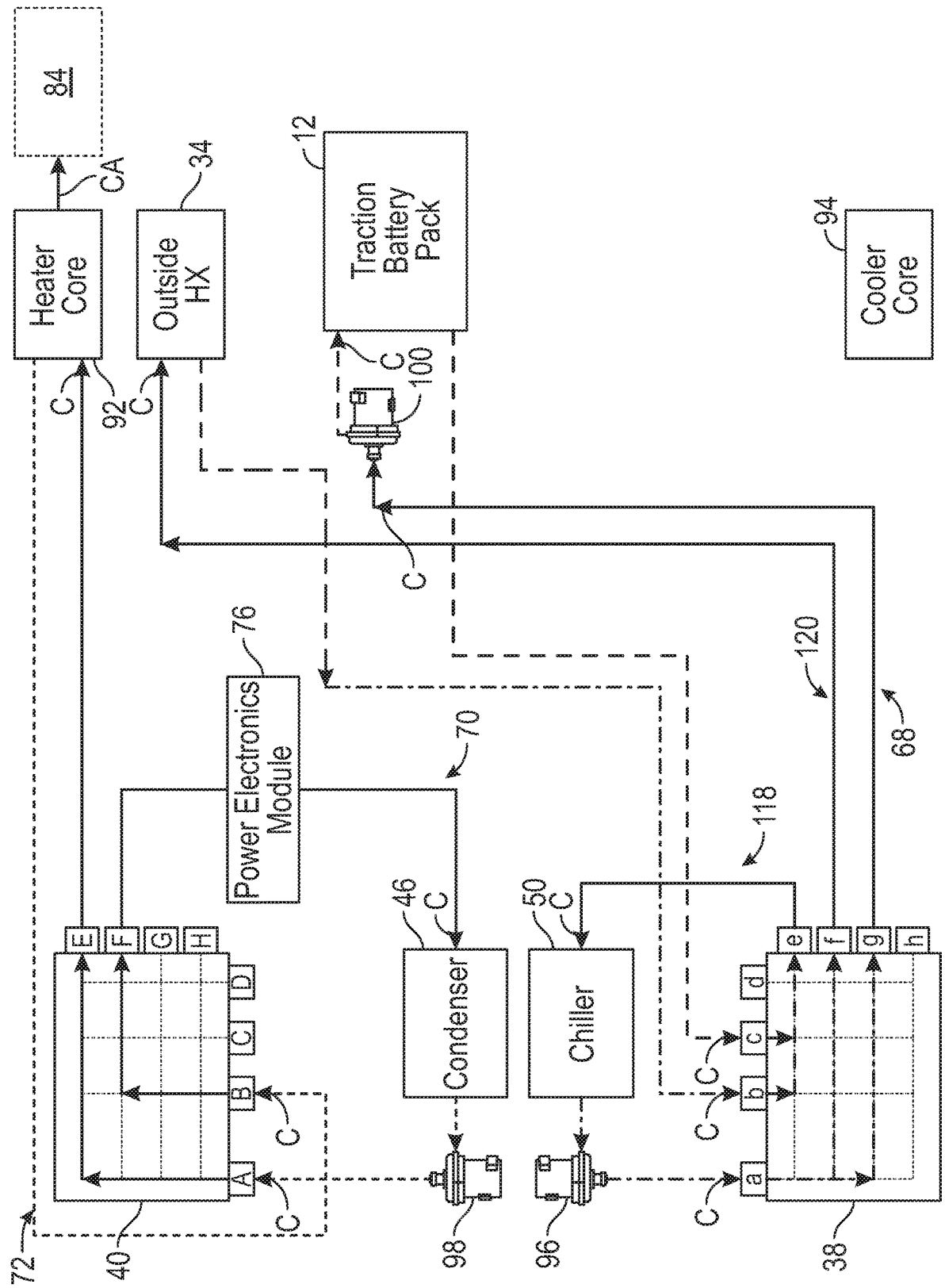
FIG. 12 schematically illustrates a third exemplary thermal control mode of an electrified vehicle integrated thermal management system.

FIG. 12 illustrates the third exemplary thermal control mode for actively cooling the traction battery pack 12, cooling the power electronics module 76, and providing passenger cabin heating when charging the traction battery pack 12 with occupants within the passenger cabin 84. During this mode, coolant C is circulated through the chiller circuit 118, the outside heat exchanger circuit 120, and the first battery circuit 68 for thermally managing the traction battery pack 12, through the e-drive circuit 70 (without passing through the radiator 34) for thermally managing the components of the power electronics module 76, and through the passenger cabin heating circuit 72 for heating the passenger cabin 84. The compressor 48 of the refrigerant system 36 is turned on during this thermal control mode and therefore the coolant C directed to the traction battery pack 12 is actively cooled by the chiller 50.

Figure 13:
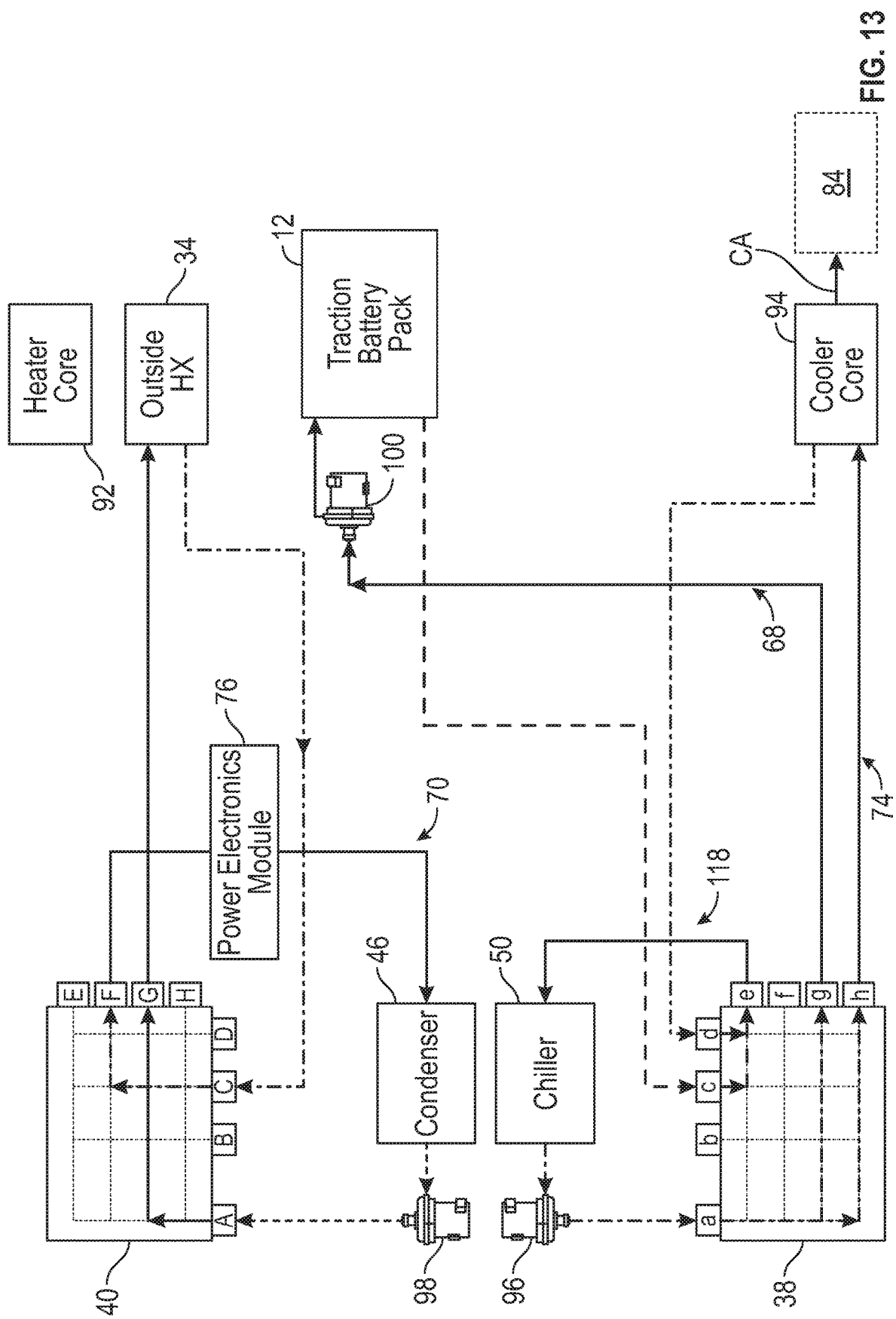
FIG. 13 schematically illustrates a fourth exemplary thermal control mode of an electrified vehicle integrated thermal management system.

FIG. 13 illustrates the fourth exemplary thermal control mode for actively cooling the traction battery pack 12, cooling the power electronics module 76, and providing passenger cabin cooling when charging the traction battery pack 12 with occupants within the passenger cabin 84. During this mode, coolant C is circulated through the chiller circuit 118 and the first battery circuit 68 for thermally managing the traction battery pack 12, through the e-drive circuit 70 for thermally managing the components of the power electronics module 76, and through the passenger cabin cooling circuit 74 for cooling the passenger cabin 84. The compressor 48 of the refrigerant system 36 is turned on during this thermal control mode and therefore the coolant C directed to the traction battery pack 12 is actively cooled by the chiller 50.

Figure 14:
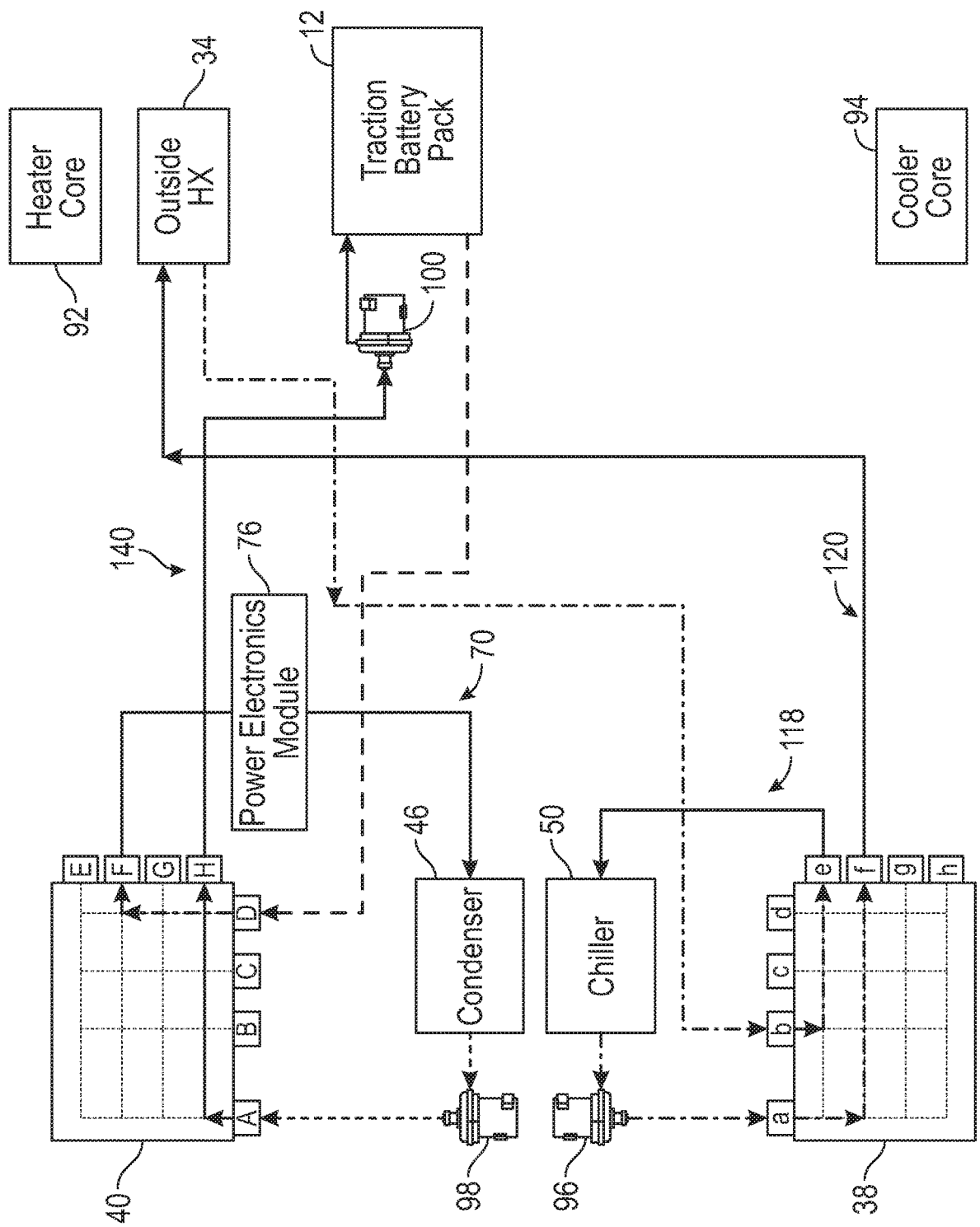
FIG. 14 schematically illustrates a fifth exemplary thermal control mode of an electrified vehicle integrated thermal management system.

FIG. 14 illustrates the fifth exemplary thermal control mode for conditioning the traction battery pack 12 when charging during cold ambient conditions. The traction battery pack 12 may be heated during this thermal control mode by circulating the coolant C through the outside heat exchanger circuit 120, the chiller circuit 118, the e-drive circuit 70, and the second battery circuit 140.

Figure 15:
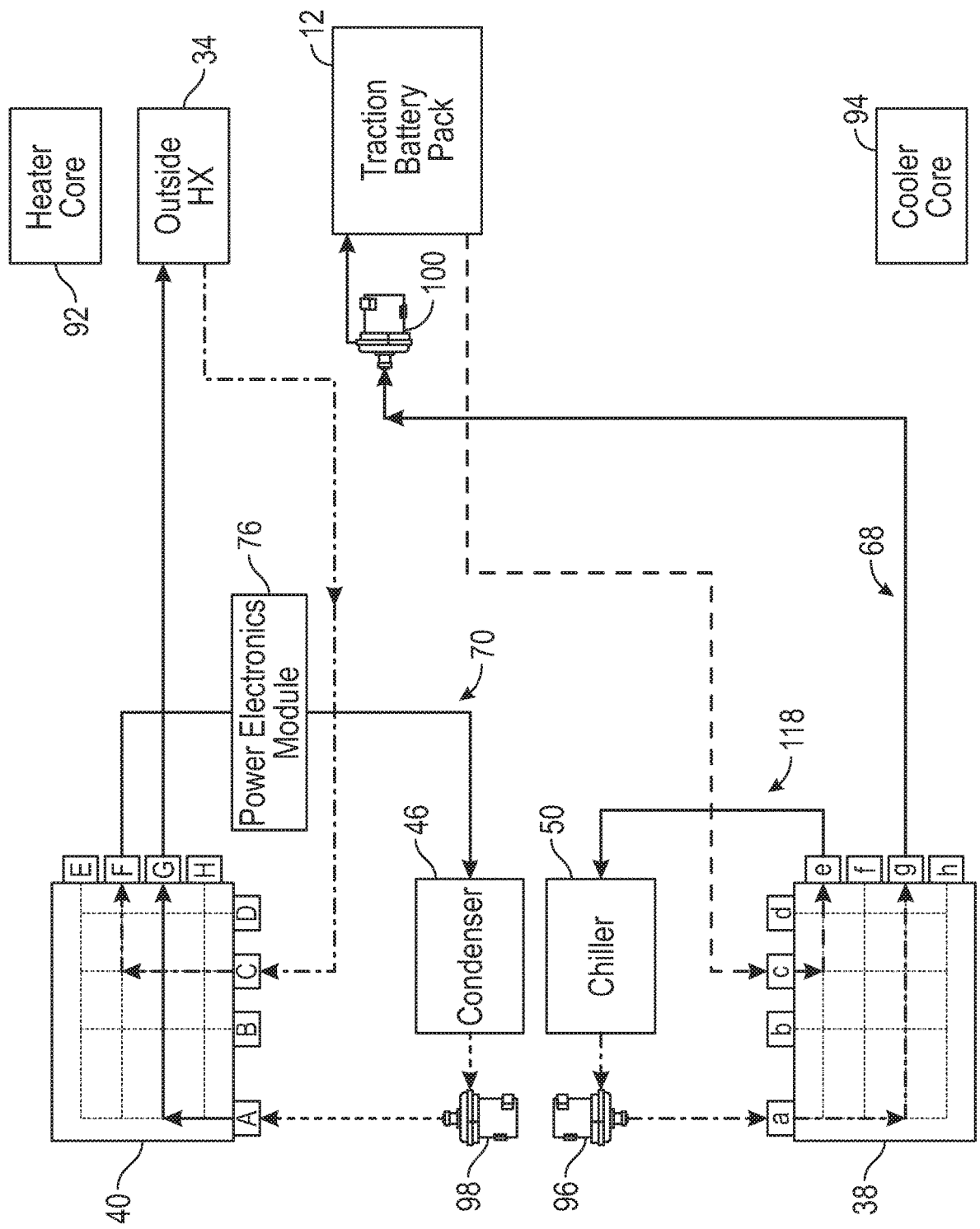
FIG. 15 schematically illustrates a sixth exemplary thermal control mode of an electrified vehicle integrated thermal management system.

FIG. 15 illustrates the sixth exemplary thermal control mode for conditioning the traction battery pack 12 when charging during hot ambient conditions. The traction battery pack 12 may be cooled during this thermal control mode by circulating the coolant C through the chiller circuit 118, the first battery circuit 68, and the e-drive circuit 70.

Figure 16:
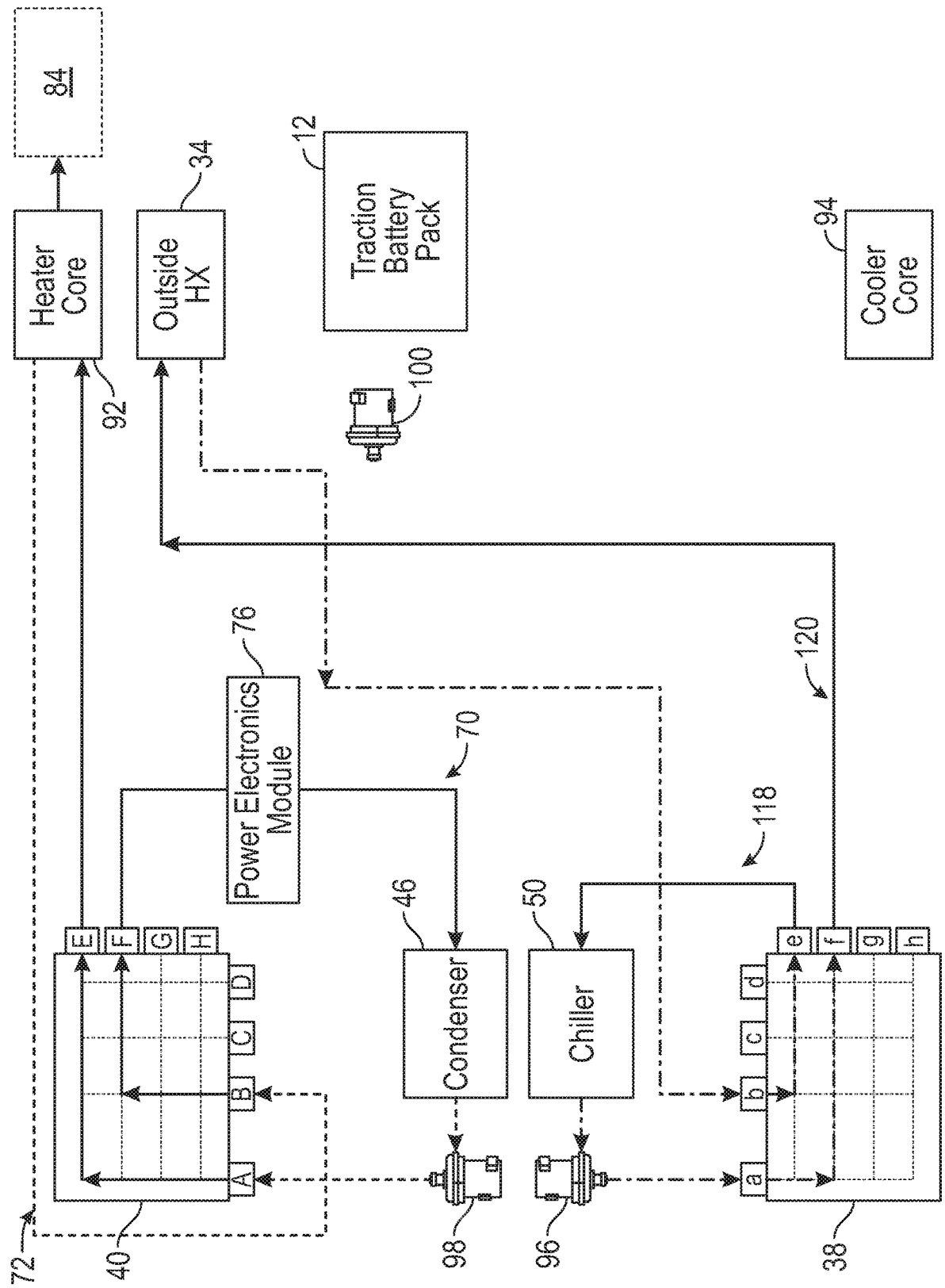
FIG. 16 schematically illustrates a seventh exemplary thermal control mode of an electrified vehicle integrated thermal management system.

FIG. 16 illustrates the seventh exemplary thermal control mode for preconditioning the passenger cabin 84 during cold ambient conditions. Heated conditioned airflow CA may be delivered to the passenger cabin 84 during this mode by circulating the coolant C through the chiller circuit 118, the outside heat exchanger circuit 120, the e-drive circuit 70, and the passenger cabin heating circuit 74.

Figure 17:
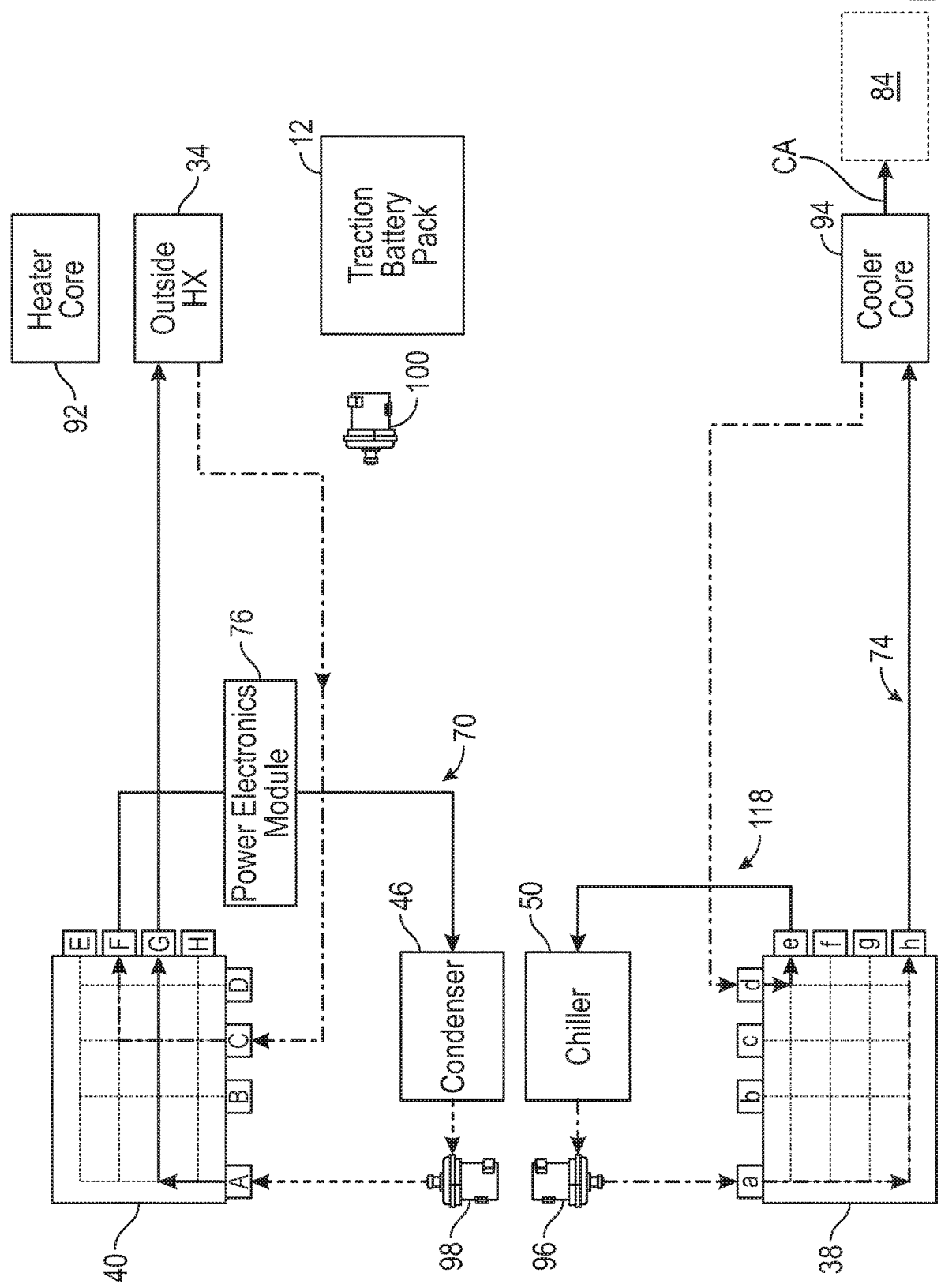
FIG. 17 schematically illustrates an eighth exemplary thermal control mode of an electrified vehicle integrated thermal management system.

FIG. 17 illustrates the eight exemplary thermal control mode for preconditioning the passenger cabin 84 during hot ambient conditions. Cooled conditioned airflow CA may be delivered to the passenger cabin 84 during this mode by circulating the coolant C through the chiller circuit 118, the e-drive circuit 70, and the passenger cabin cooling circuit 74.

Figure 18:
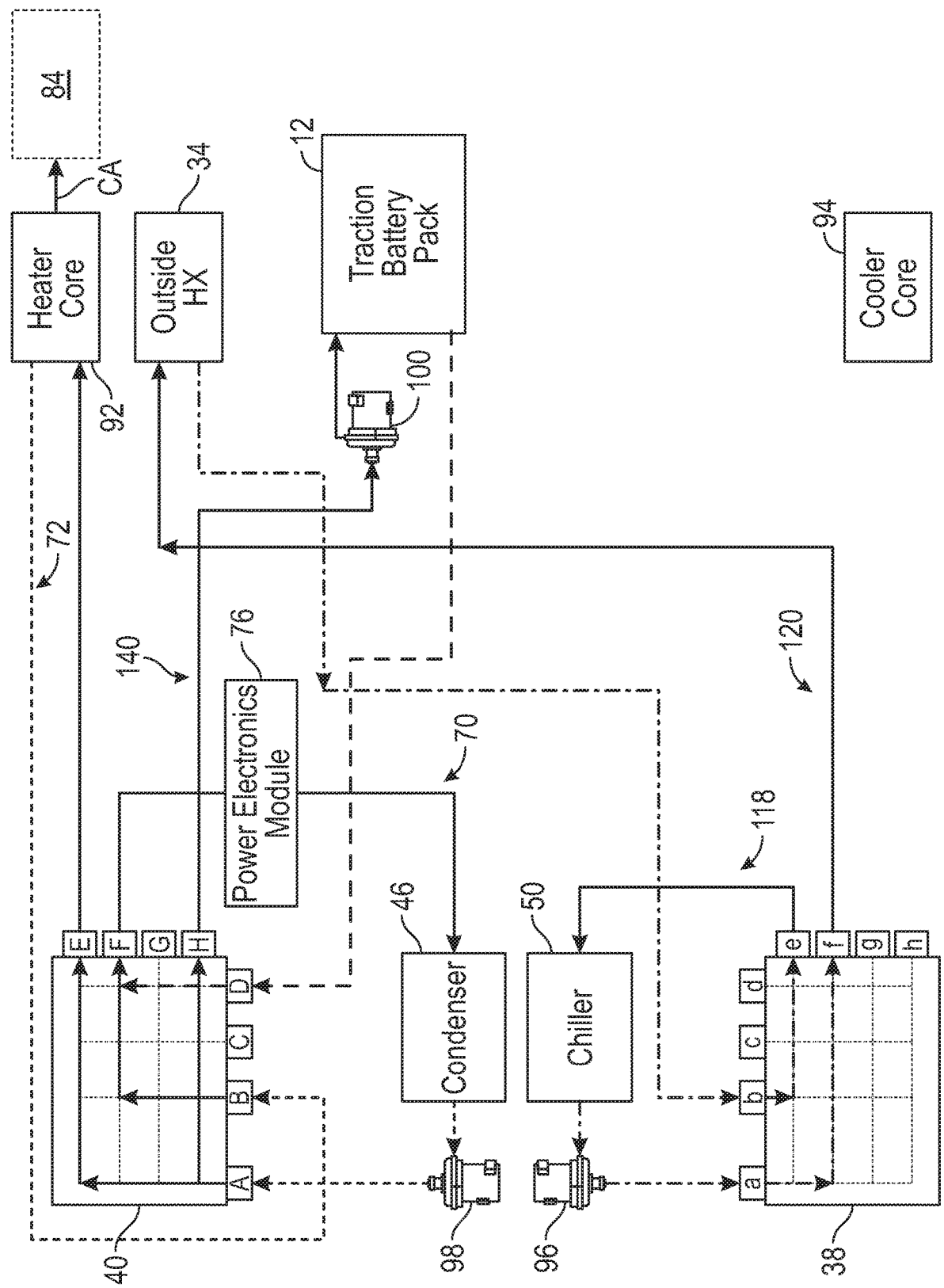
FIG. 18 schematically illustrates a ninth exemplary thermal control mode of an electrified vehicle integrated thermal management system.

FIG. 18 illustrates the ninth exemplary thermal control mode for preconditioning the passenger cabin 84 and the traction battery pack 12 during cold ambient conditions. Heated conditioned airflow CA may be delivered to the passenger cabin 84 and heated coolant C may be delivered to the traction battery pack 12 during this mode by circulating the coolant C through the chiller circuit 118, the outside heat exchanger circuit 120, the e-drive circuit 70, the second battery circuit 140, and the passenger cabin heating circuit 72.

Figure 19:
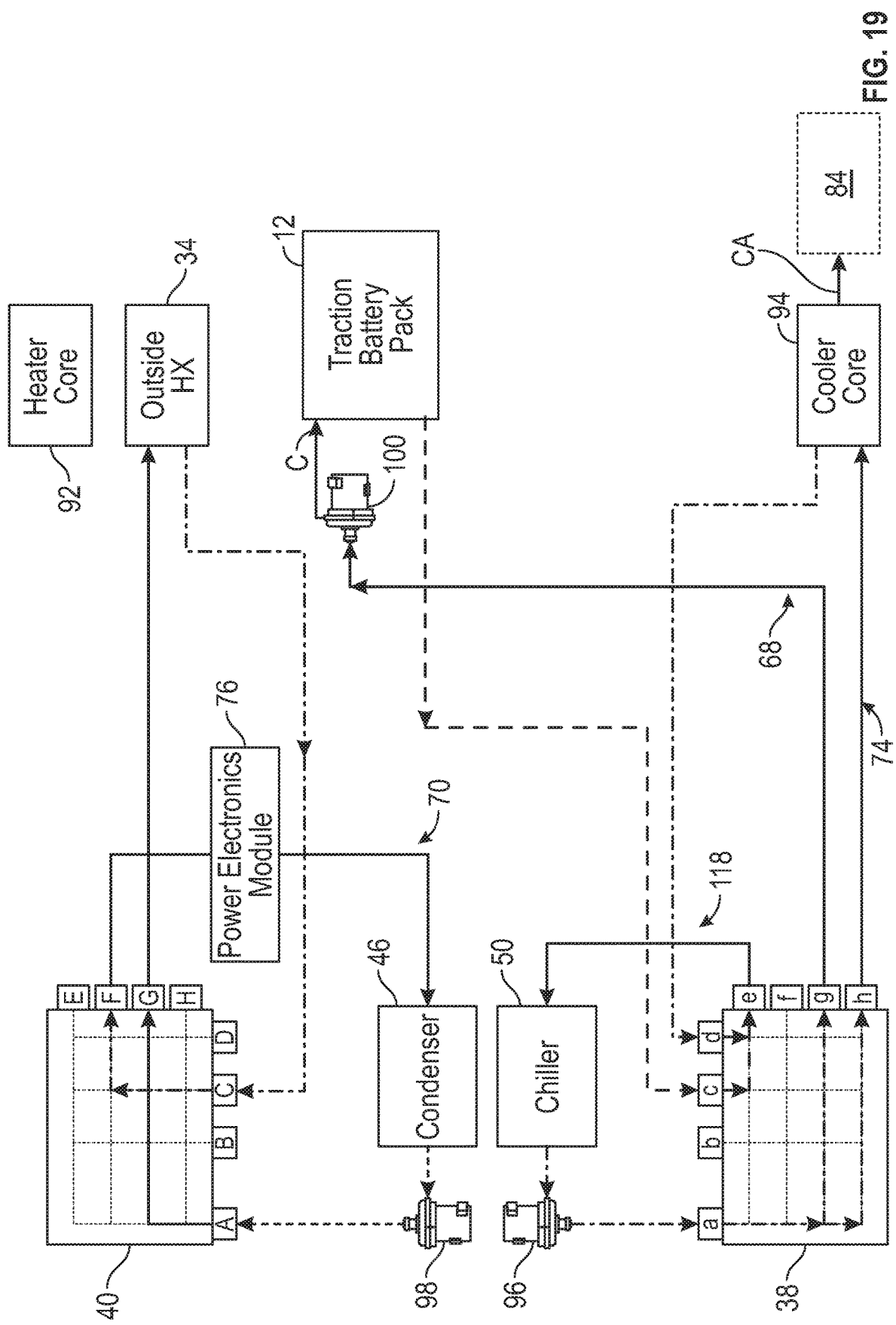
FIG. 19 schematically illustrates a tenth exemplary thermal control mode of an electrified vehicle integrated thermal management system.

FIG. 19 illustrates the tenth exemplary thermal control mode for preconditioning the passenger cabin 84 and the traction battery pack 12 during hot ambient conditions. Cooled conditioned airflow CA may be delivered to the passenger cabin 84 and cooled coolant C may be delivered to the traction battery pack 12 during this mode by circulating the coolant C through the chiller circuit 118, the e-drive circuit 70, the first battery circuit 68, and the passenger cabin cooling circuit 74.

Figure 20:
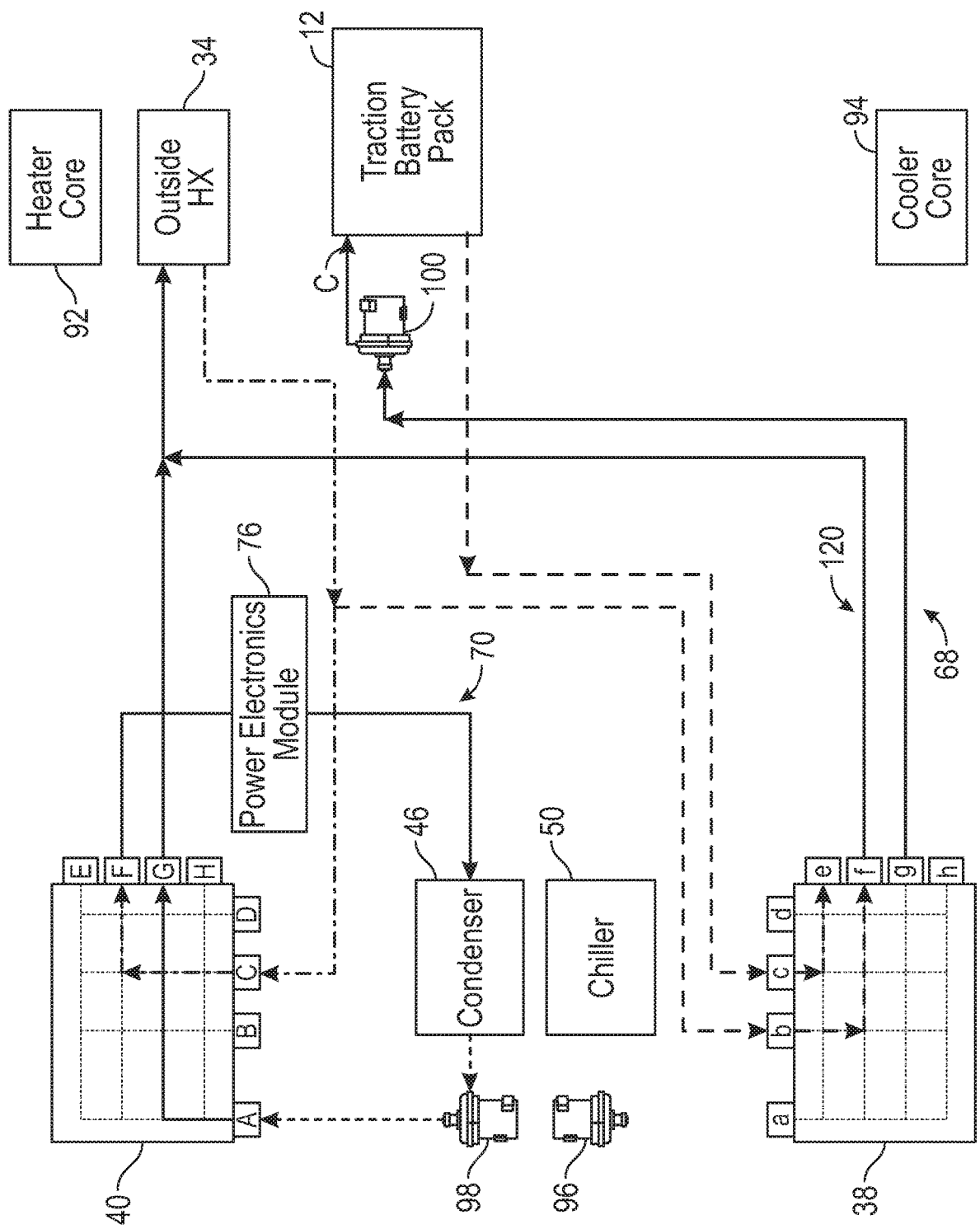
FIG. 20 schematically illustrates an eleventh exemplary thermal control mode of an electrified vehicle integrated thermal management system.

FIG. 20 illustrates the eleventh exemplary thermal control mode for passively cooling the traction battery pack 12 and for cooling the power electronics module 76 during mild ambient conditions when operating the electrified vehicle 10 during a drive cycle. During this mode, coolant C is circulated through the first battery circuit 68 and the outside heat exchanger circuit 120 for thermally managing the traction battery pack 12 and through the e-drive circuit 70 for thermally managing the components of the power electronics module 76.

Figure 21:
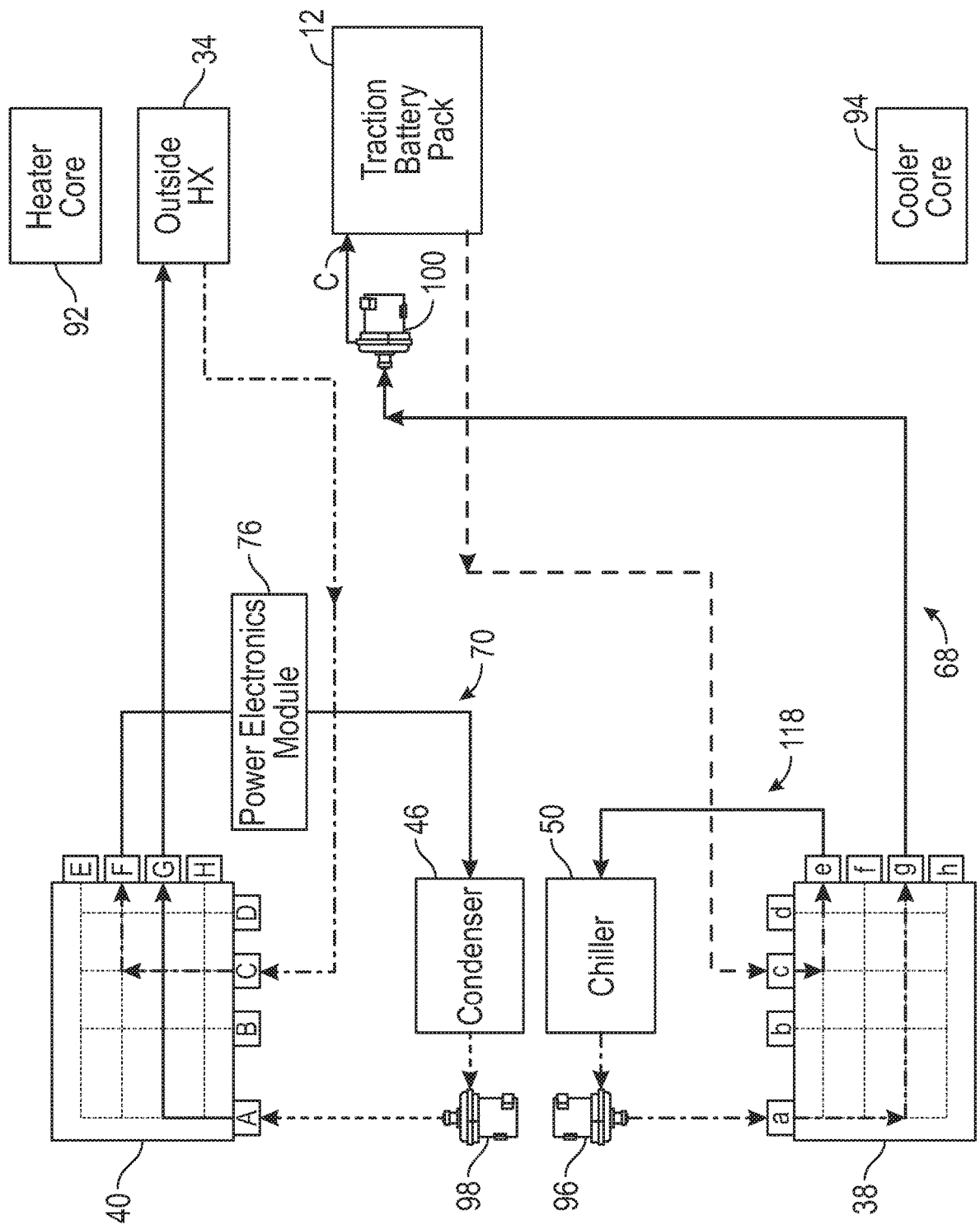
FIG. 21 schematically illustrates a twelfth exemplary thermal control mode of an electrified vehicle integrated thermal management system.

FIG. 21 illustrates the twelfth exemplary thermal control mode for actively cooling the traction battery pack 12 and for cooling the power electronics module 76 during a drive cycle of the electrified vehicle 10. During this mode, coolant C is circulated through the first battery circuit 68 and the chiller circuit 118 for thermally managing the traction battery pack 12 and through the e-drive circuit 70 for thermally managing the components of the power electronics module 76.

Figure 22:
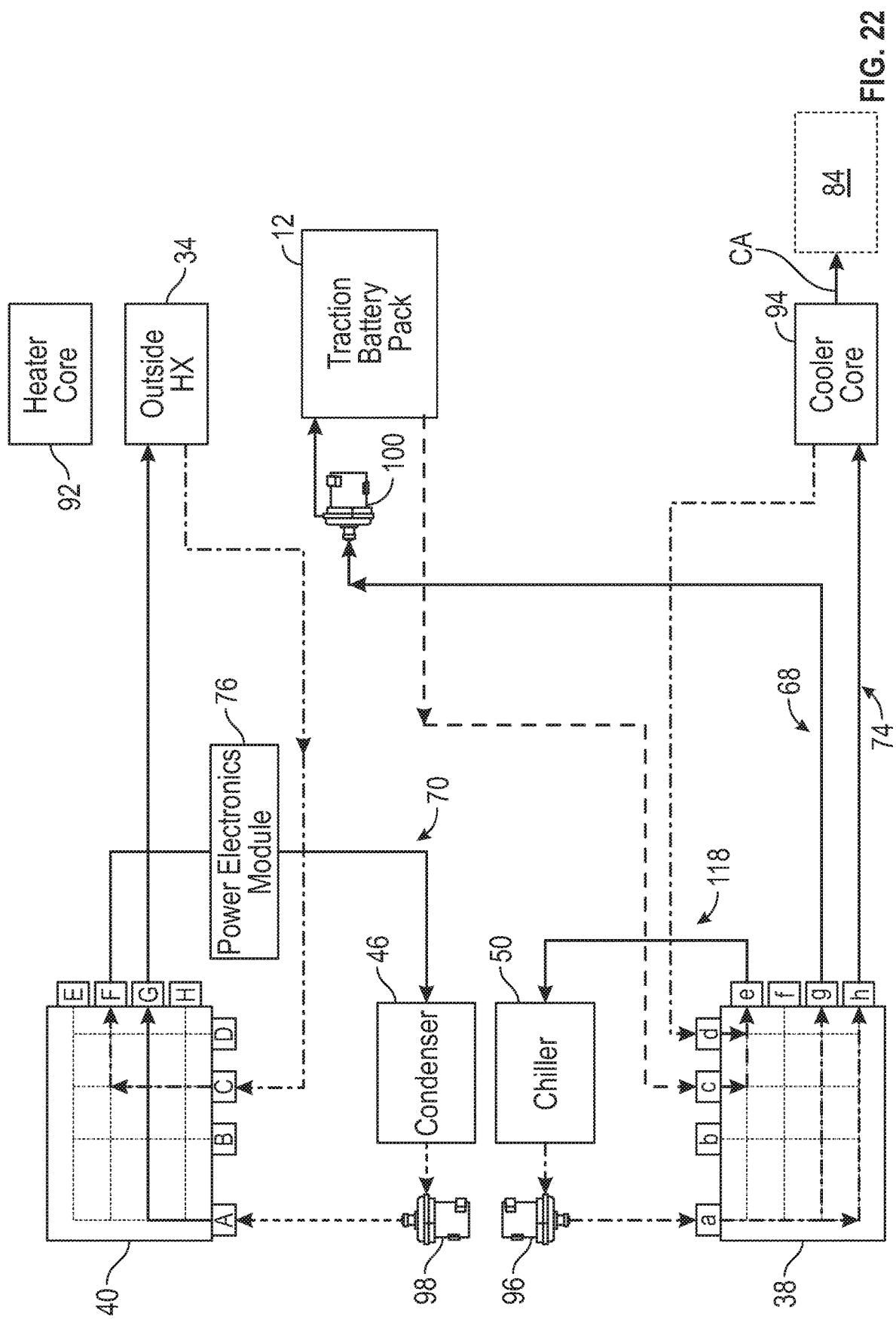
FIG. 22 schematically illustrates a thirteenth exemplary thermal control mode of an electrified vehicle integrated thermal management system.

FIG. 22 illustrates the thirteenth exemplary thermal control mode for actively cooling the traction battery pack 12, cooling the power electronics module 76, and providing passenger cabin cooling during a drive cycle of the electrified vehicle 10. During this mode, coolant C is circulated through the chiller circuit 118 and the first battery circuit 68 for thermally managing the traction battery pack 12, through the e-drive circuit 70 for thermally managing the components of the power electronics module 76, and through the passenger cabin cooling circuit 74 for cooling the passenger cabin 84.

Figure 23:
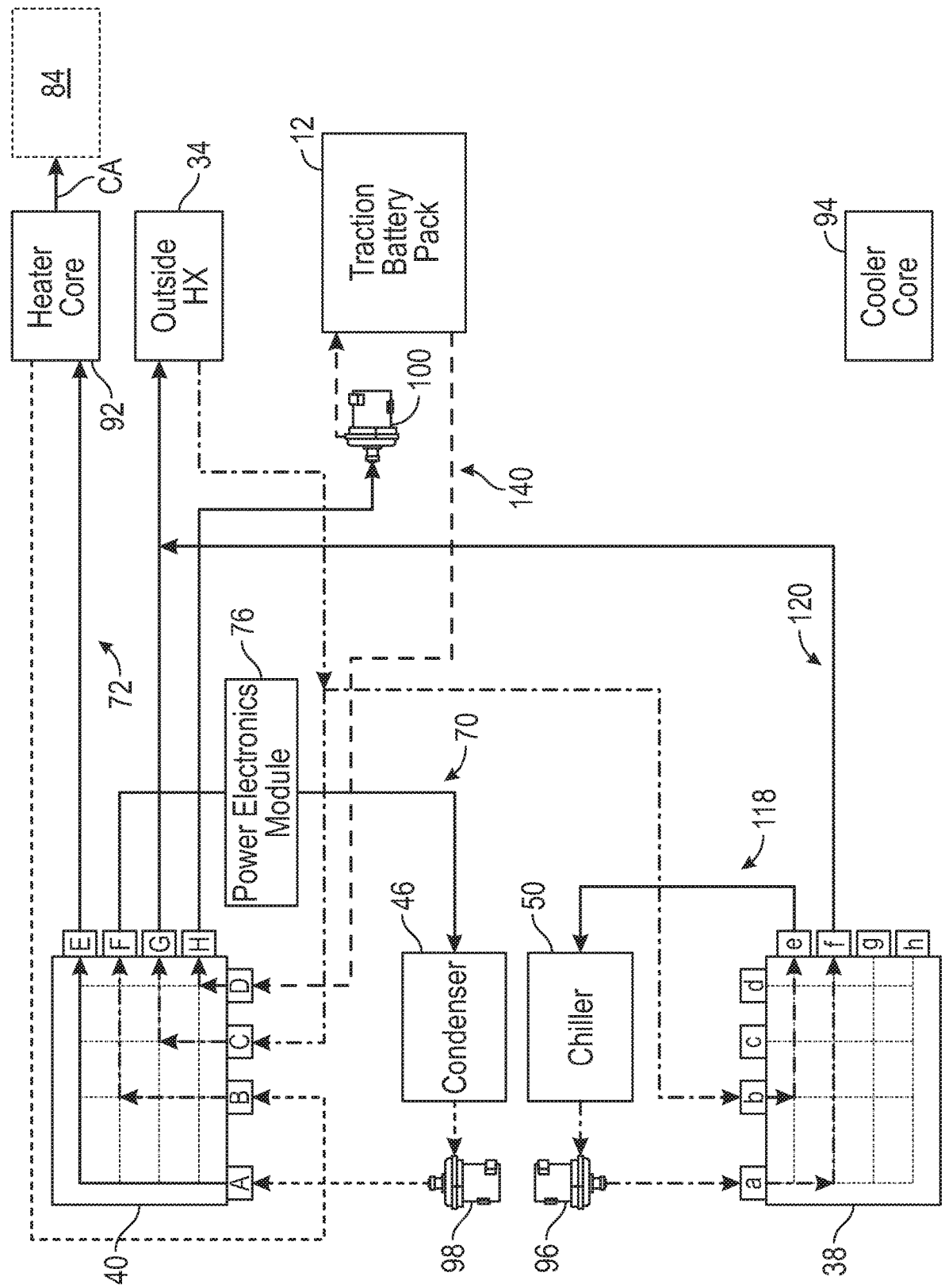
FIG. 23 schematically illustrates a fourteenth exemplary thermal control mode of an electrified vehicle integrated thermal management system.

FIG. 23 illustrates the fourteenth exemplary thermal control mode for providing equalization (i.e., circulation) within the traction battery pack 12, cooling of the power electronics module 76, and providing passenger cabin heating during a drive cycle of the electrified vehicle 10. During this mode, coolant C is circulated through the chiller circuit 118, the outside heat exchanger circuit 120, and the second battery circuit 140 for equalizing the traction battery pack 12, through the e-drive circuit 70 for thermally managing the components of the power electronics module 76, and through the passenger cabin heating circuit 72 for heating the passenger cabin 84.

Figure 24:
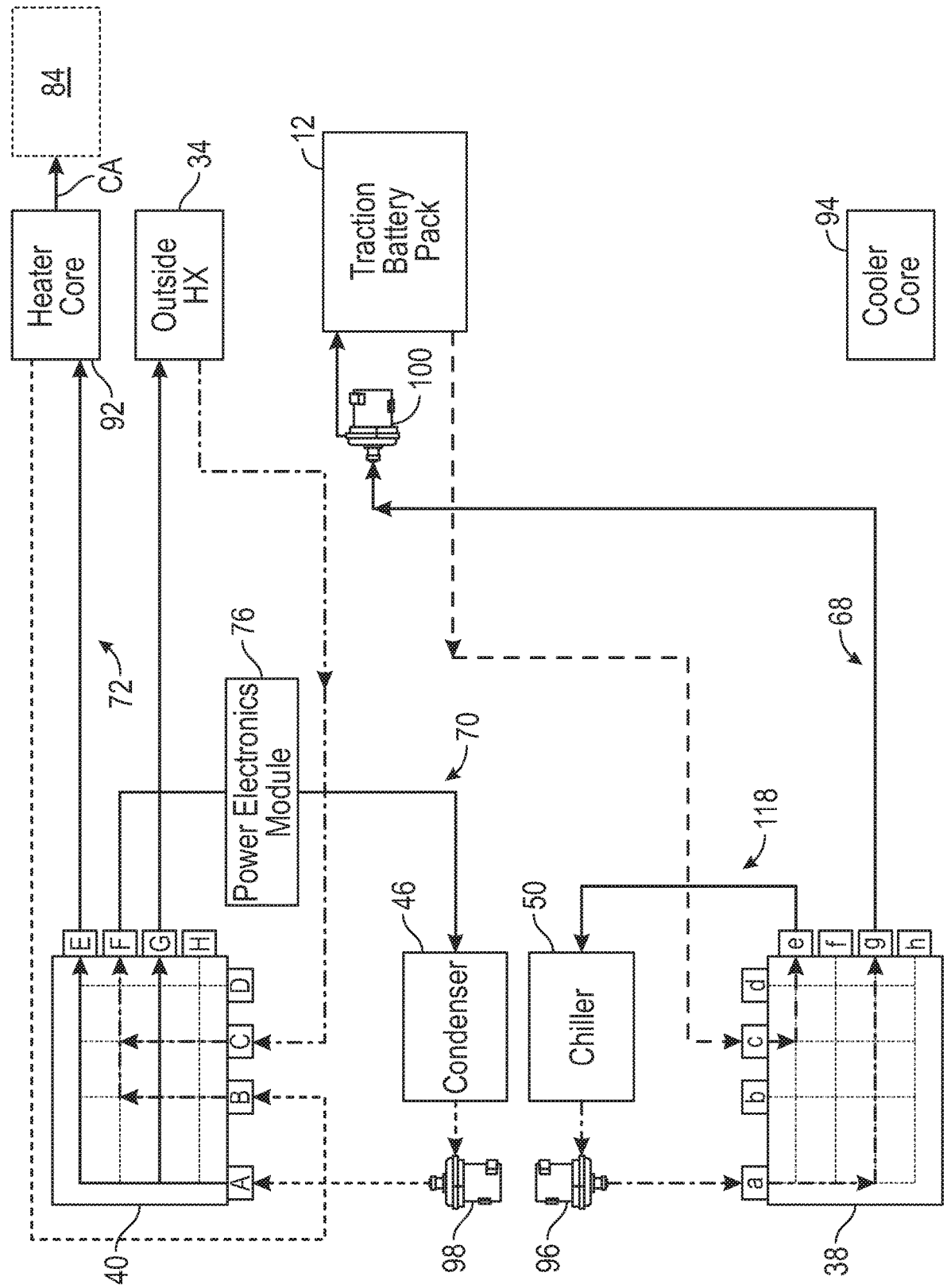
FIG. 24 schematically illustrates a fifteenth exemplary thermal control mode of an electrified vehicle integrated thermal management system.

FIG. 24 illustrates the fifteenth exemplary thermal control mode for actively cooling the traction battery pack 12, cooling the power electronics module 76, and providing passenger cabin heating during a drive cycle of the electrified vehicle 10. During this mode, coolant C is circulated through the chiller circuit 118 and the first battery circuit 68 for thermally managing the traction battery pack 12, through the e-drive circuit 70 for thermally managing the components of the power electronics module 76, and through the passenger cabin heating circuit 72 for heating the passenger cabin 84.

Figure 25:
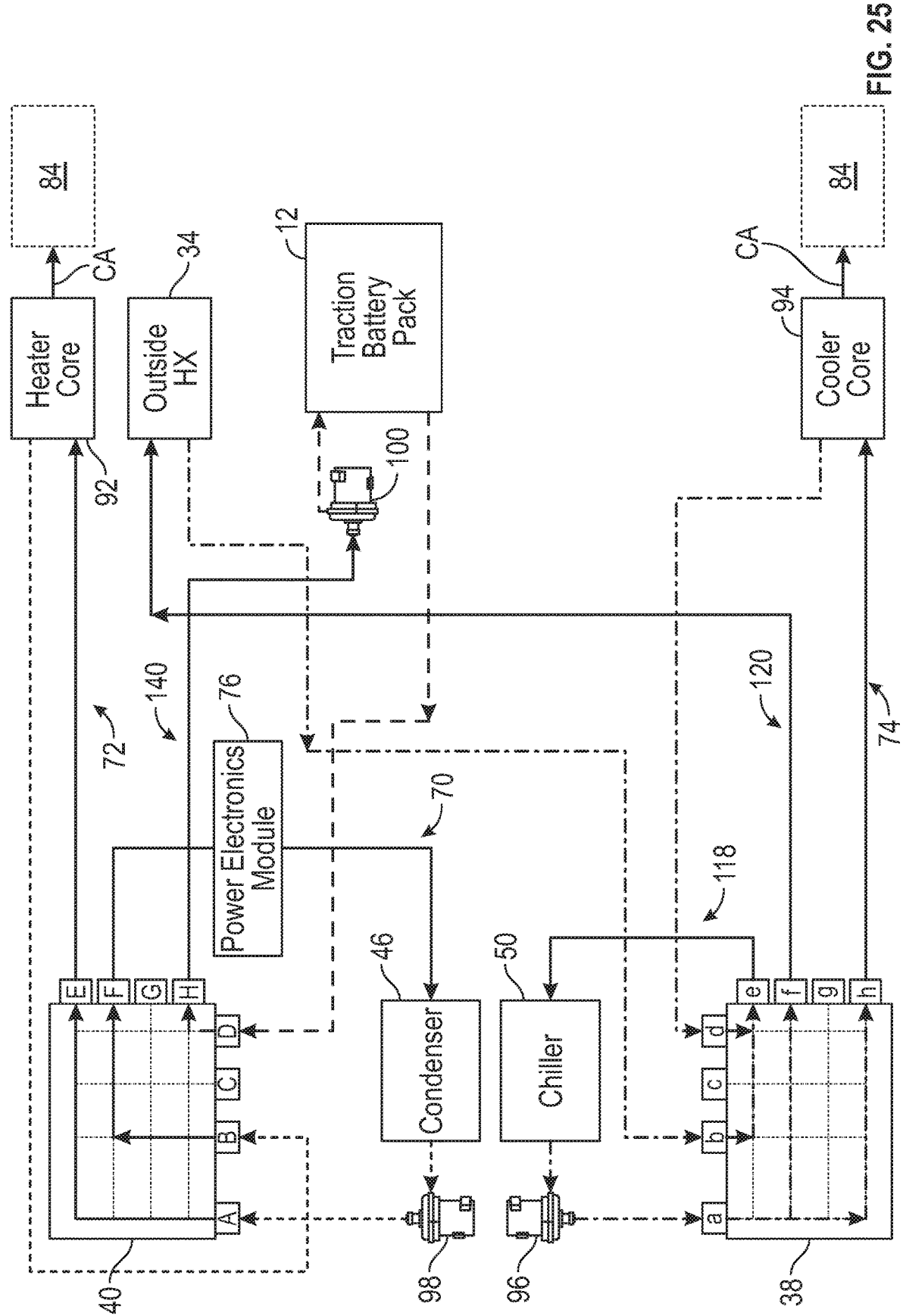
FIG. 25 schematically illustrates a sixteenth exemplary thermal control mode of an electrified vehicle integrated thermal management system.

FIG. 25 illustrates the sixteenth exemplary thermal control mode for providing equalization within the traction battery pack 12, cooling of the power electronics module 76, and providing passenger cabin heating and dehumidification during a drive cycle of the electrified vehicle 10. During this mode, coolant C is circulated through the chiller circuit 118, the outside heat exchanger circuit 120, and the second battery circuit 140 for equalizing the traction battery pack 12, through the e-drive circuit 70 for thermally managing the components of the power electronics module 76, through the passenger cabin heating circuit 72 for heating the passenger cabin 84, and through the passenger cabin cooling circuit 74 for dehumidifying the passenger cabin 84.

Figure 26:
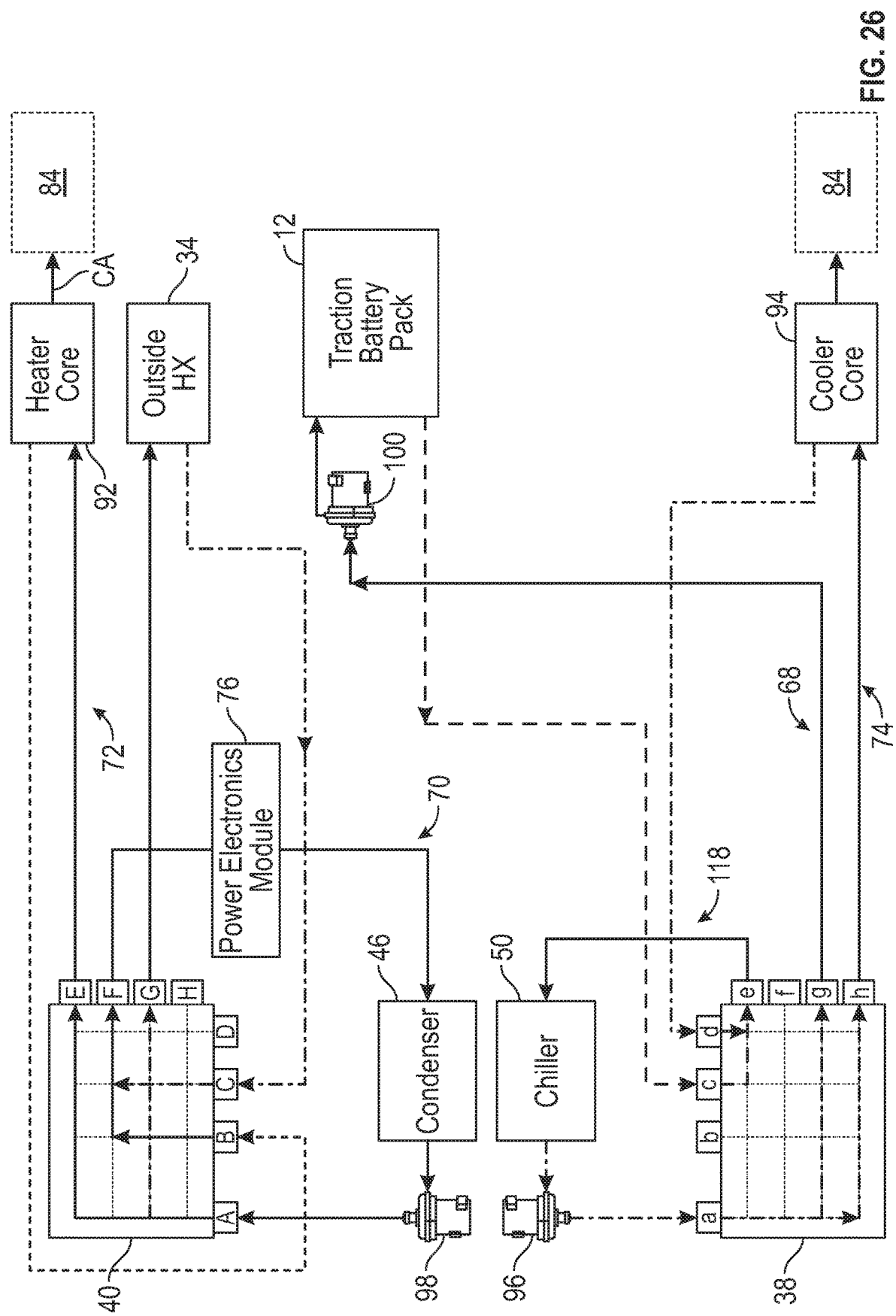
FIG. 26 schematically illustrates a seventeenth exemplary thermal control mode of an electrified vehicle integrated thermal management system.

FIG. 26 illustrates the seventeenth exemplary thermal control mode for actively cooling the traction battery pack 12, cooling the power electronics module 76, and providing passenger cabin heating and dehumidification during a drive cycle of the electrified vehicle 10. During this mode, coolant C is circulated through the chiller circuit 118 and the first battery circuit 68 for thermally managing the traction battery pack 12, through the e-drive circuit 70 for thermally managing the components of the power electronics module 76, through the passenger cabin heating circuit 72 for heating the passenger cabin 84, and through the passenger cabin cooling circuit 74 for dehumidifying the passenger cabin 84.

Figure 27:
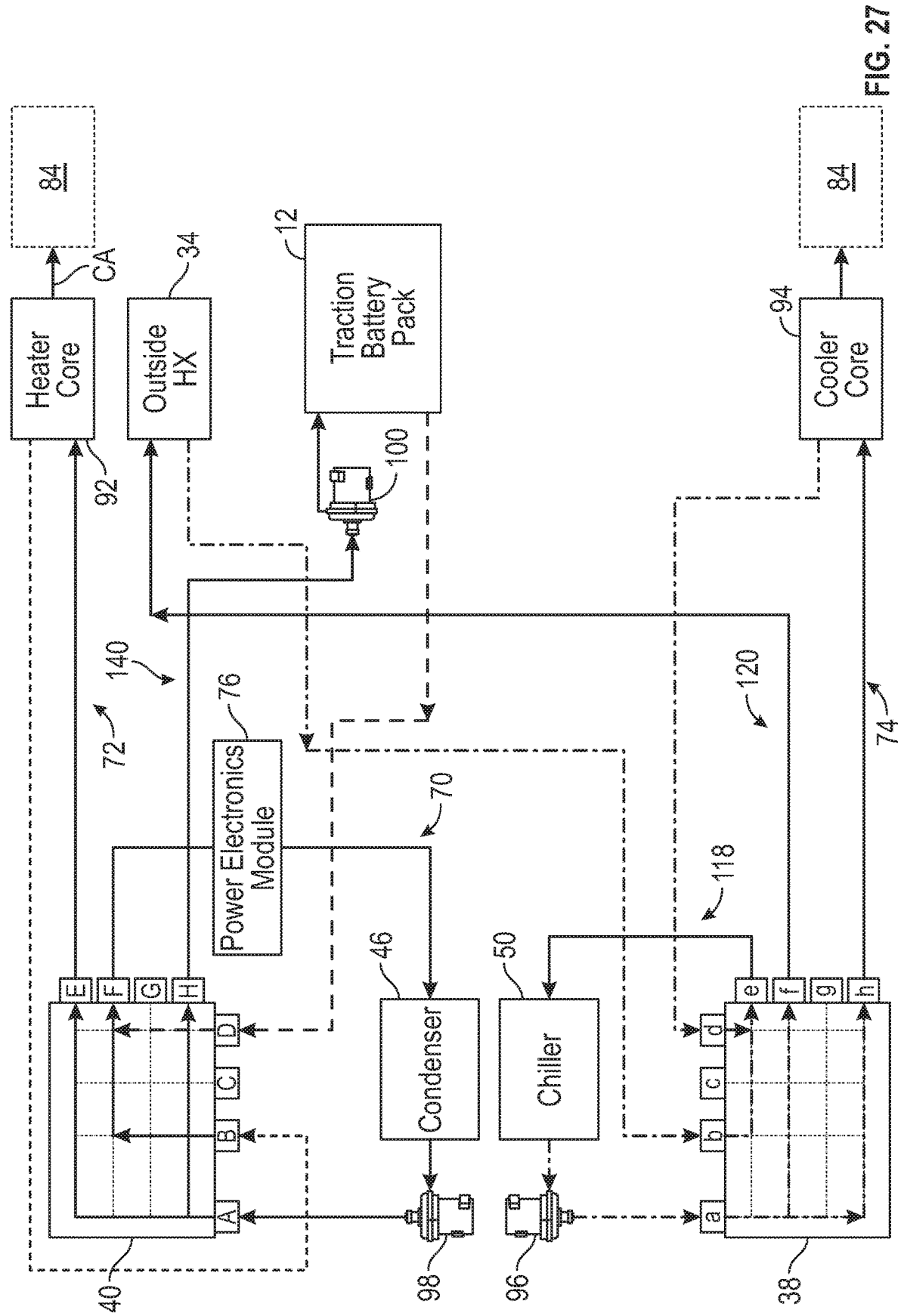
FIG. 27 schematically illustrates an eighteenth exemplary thermal control mode of an electrified vehicle integrated thermal management system.

FIG. 27 illustrates the eighteenth exemplary thermal control mode for heating the traction battery pack 12, cooling the power electronics module 76, and providing passenger cabin heating and dehumidification during a drive cycle of the electrified vehicle 10. During this mode, coolant C is circulated through the chiller circuit 118, the outside heat exchanger circuit 120, and the second battery circuit 140 for heating the traction battery pack 12, through the e-drive circuit 70 for thermally managing the components of the power electronics module 76, through the passenger cabin heating circuit 72 for heating the passenger cabin 84, and through the passenger cabin cooling circuit 74 for dehumidifying the passenger cabin 84.

Figure 28:
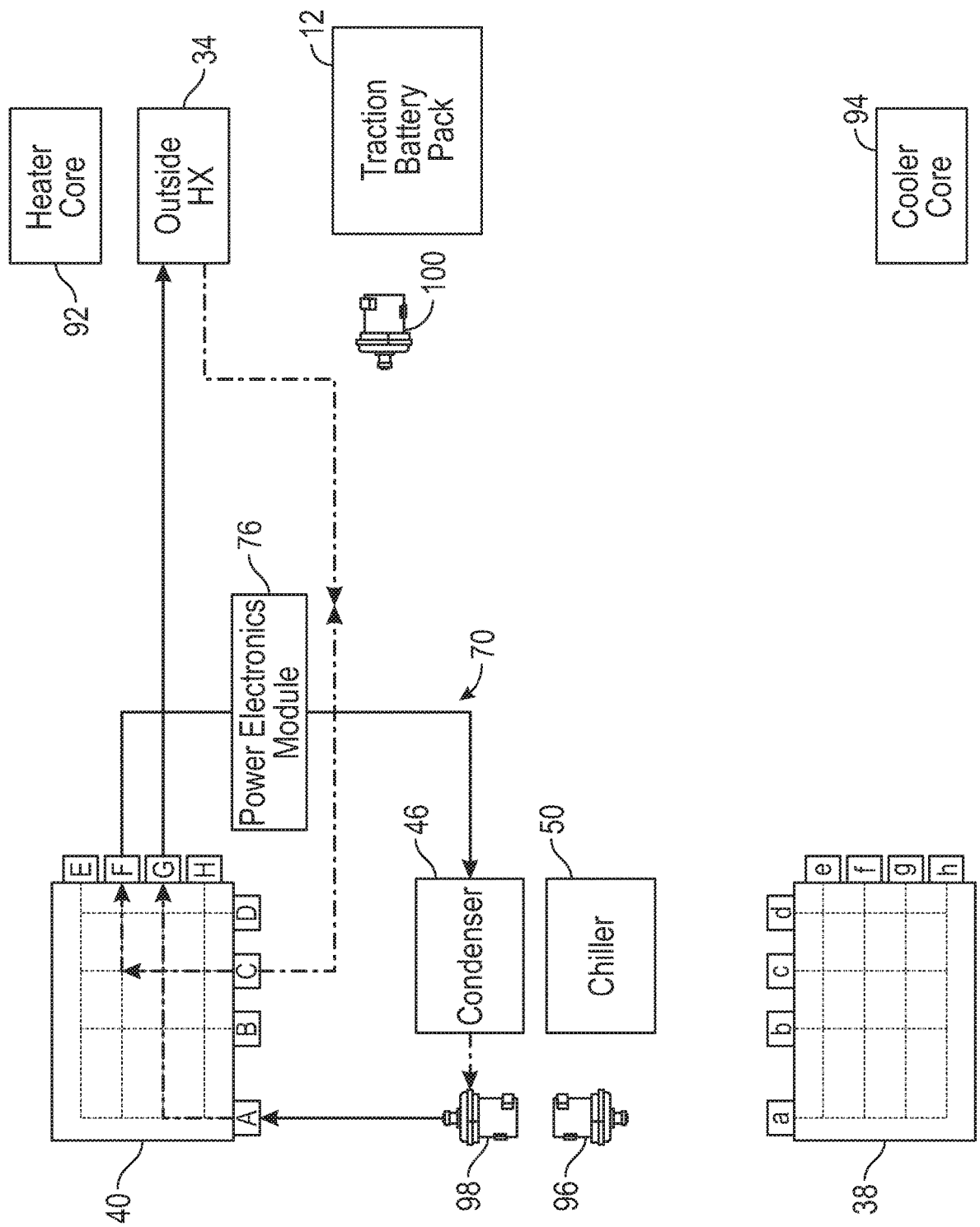
FIG. 28 schematically illustrates a nineteenth exemplary thermal control mode of an electrified vehicle integrated thermal management system.

FIG. 28 illustrates the nineteenth exemplary thermal control mode for cooling only the power electronics module 76 during a drive cycle of the electrified vehicle 10. During this mode, coolant C is circulated through the e-drive circuit 70 for thermally managing the components of the power electronics module 76. The compressor 48 is off during this thermal control mode.

Figure 29:
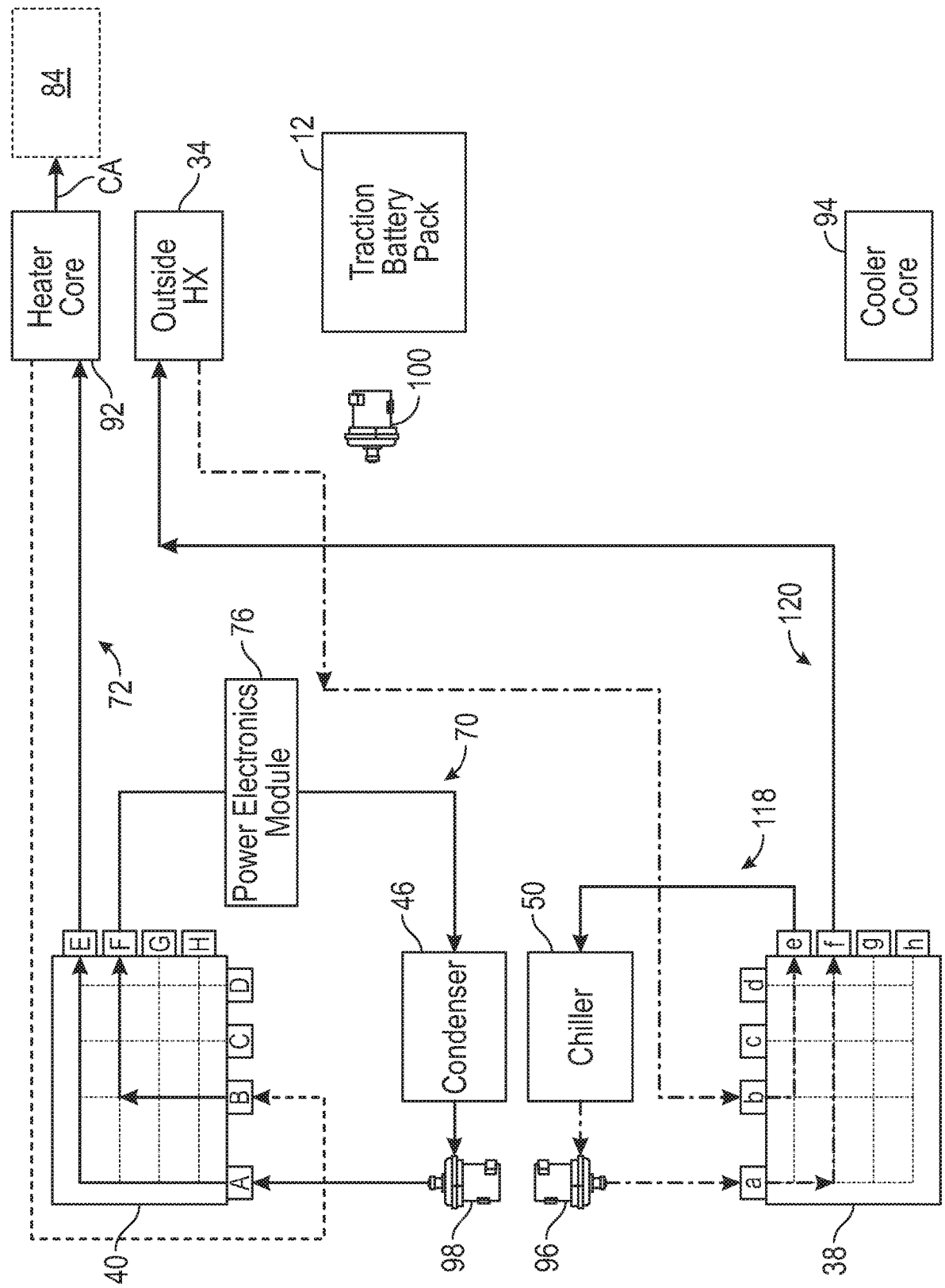
FIG. 29 schematically illustrates a twentieth exemplary thermal control mode of an electrified vehicle integrated thermal management system.

FIG. 29 illustrates the twentieth exemplary thermal control mode for providing heat recovery for the power electronics module 76 and passenger cabin heating during a drive cycle of the electrified vehicle 10. During this mode, coolant C is circulated through the chiller circuit 118, the outside heat exchanger circuit 120, and portions of the e-drive circuit 70 (e.g., without passing through the radiator 34) for providing heat recovery within the power electronics module 76 and through the passenger cabin heating circuit 72 for heating the passenger cabin 84.

Figure 30:
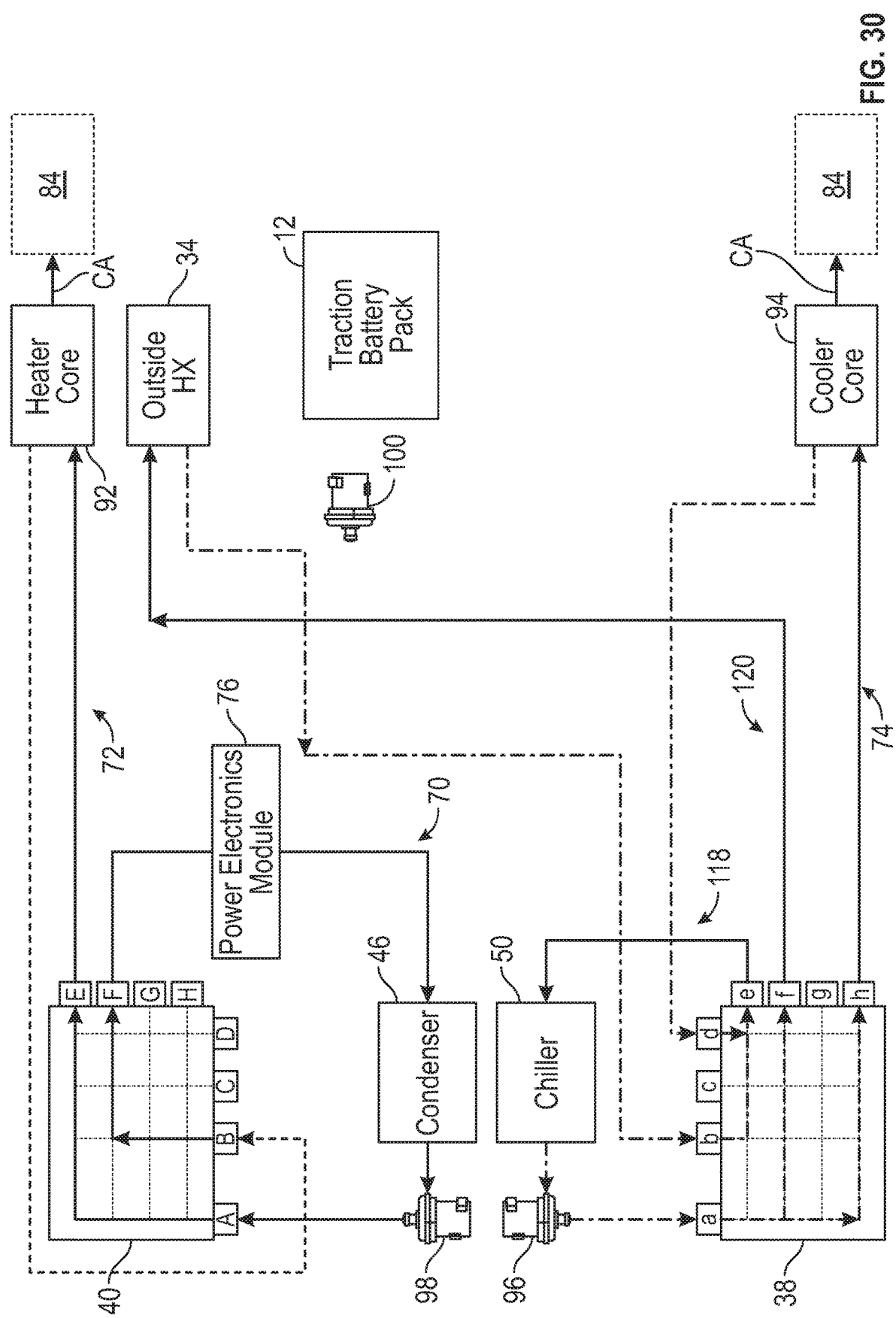
FIG. 30 schematically illustrates a twenty-first exemplary thermal control mode of an electrified vehicle integrated thermal management system.

FIG. 30 illustrates the twenty-first thermal control mode for providing heat recovery for the power electronics module 76 and passenger cabin heating and dehumidification during a drive cycle of the electrified vehicle 10. During this mode, coolant C is circulated through the chiller circuit 118, the outside heat exchanger circuit 120, and portions of the e-drive circuit 70 (e.g., without passing through the radiator 34) for providing heat recovery within the power electronics module 76, through the passenger cabin heating circuit 72 for heating the passenger cabin 84, and through the passenger cabin cooling circuit 74 for dehumidifying the passenger cabin 84.

Figure 31:
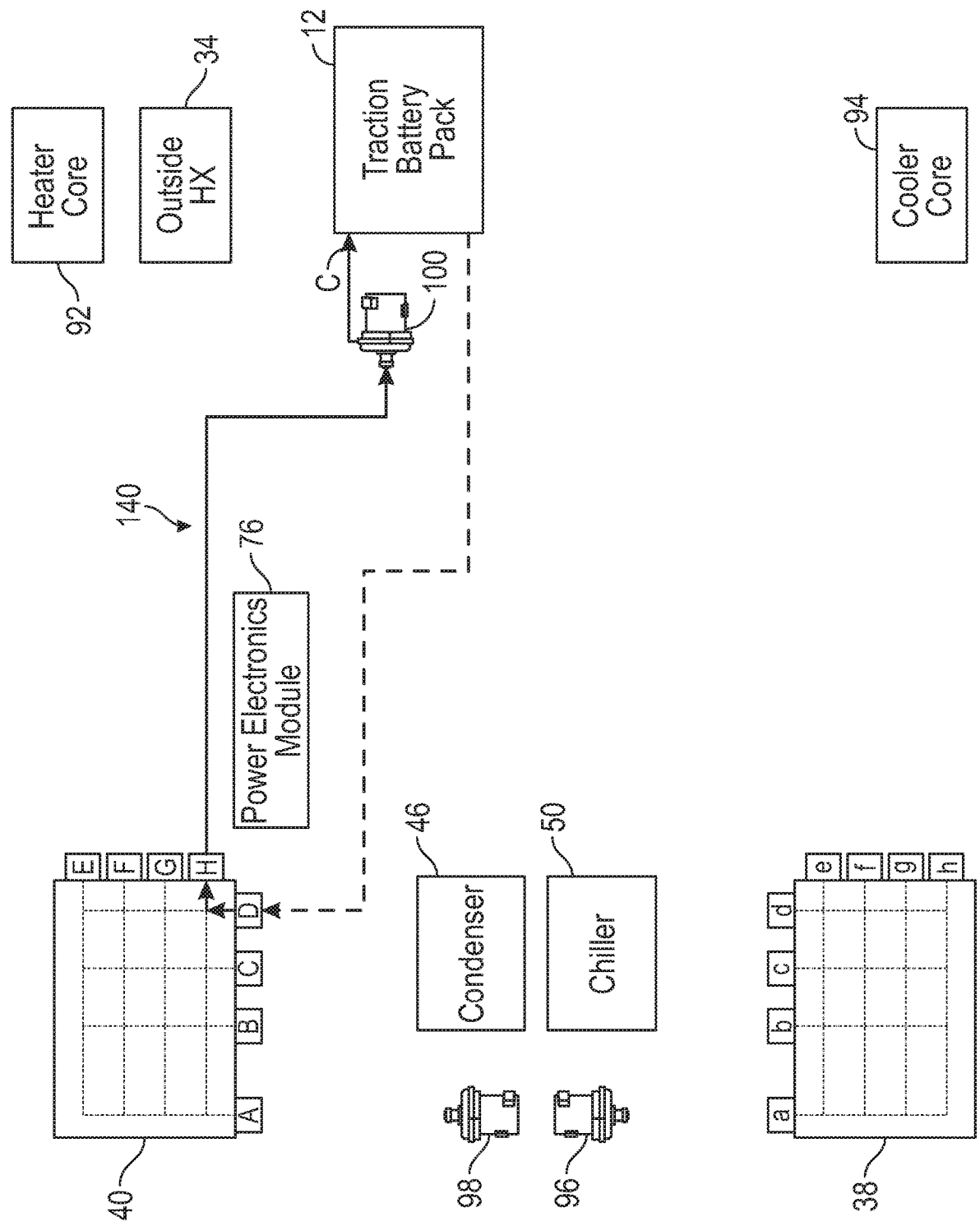
FIG. 31 schematically illustrates a twenty-second exemplary thermal control mode of an electrified vehicle integrated thermal management system.

FIG. 31 illustrates the twenty-second thermal control mode for providing battery equalization (i.e. for providing battery circulation). During this mode, coolant C is circulated solely through the second battery circuit 140 for equalizing the traction battery pack 12.

Figure 32:
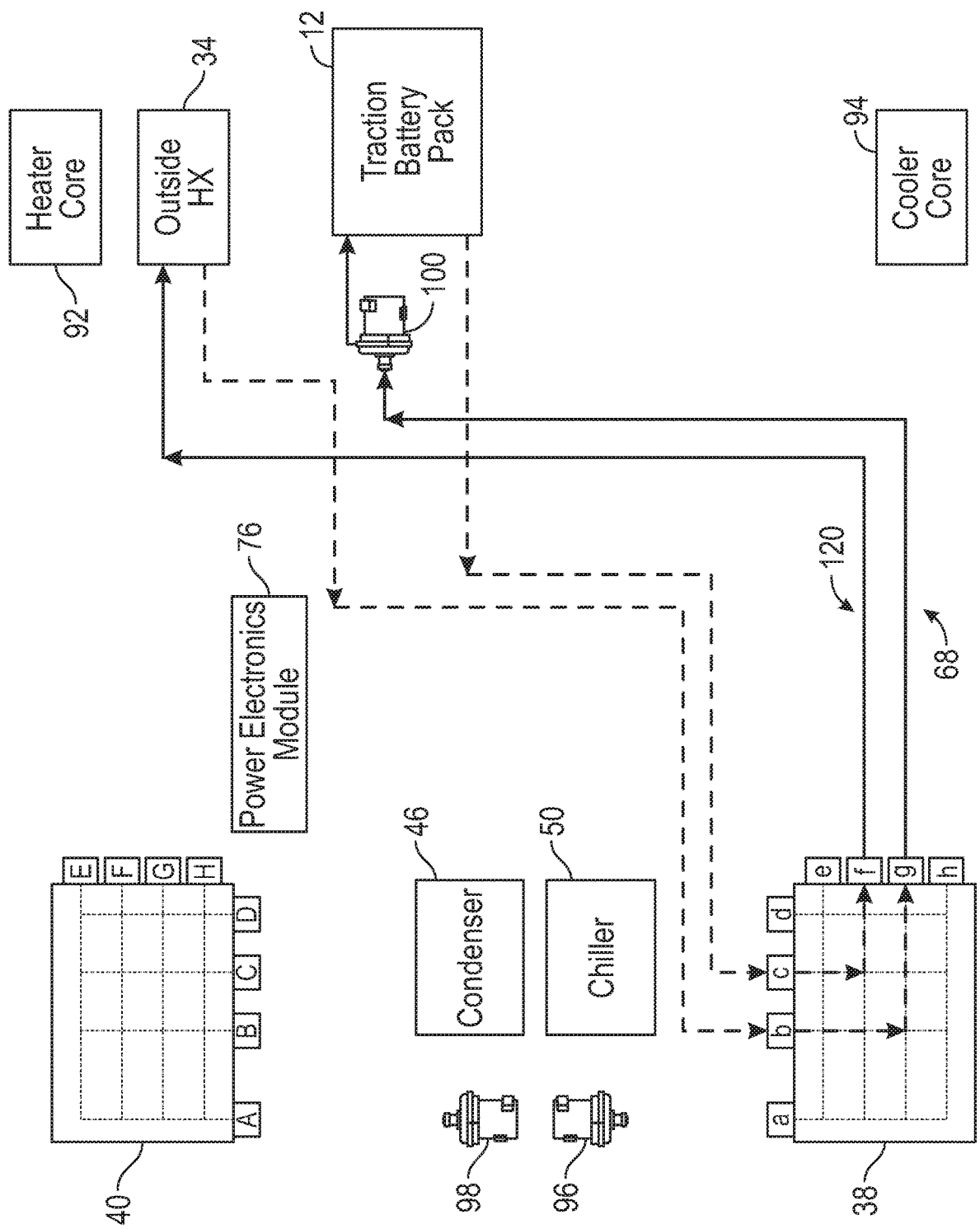
FIG. 32 schematically illustrates a twenty-third exemplary thermal control mode of an electrified vehicle integrated thermal management system.

FIG. 32 illustrates the twenty-third exemplary thermal control mode for passively cooling the traction battery pack 12. During this mode, coolant C is circulated only through the first battery circuit 68 and the outside heat exchanger circuit 120 for passively cooling the traction battery pack 12.

Figure 33:
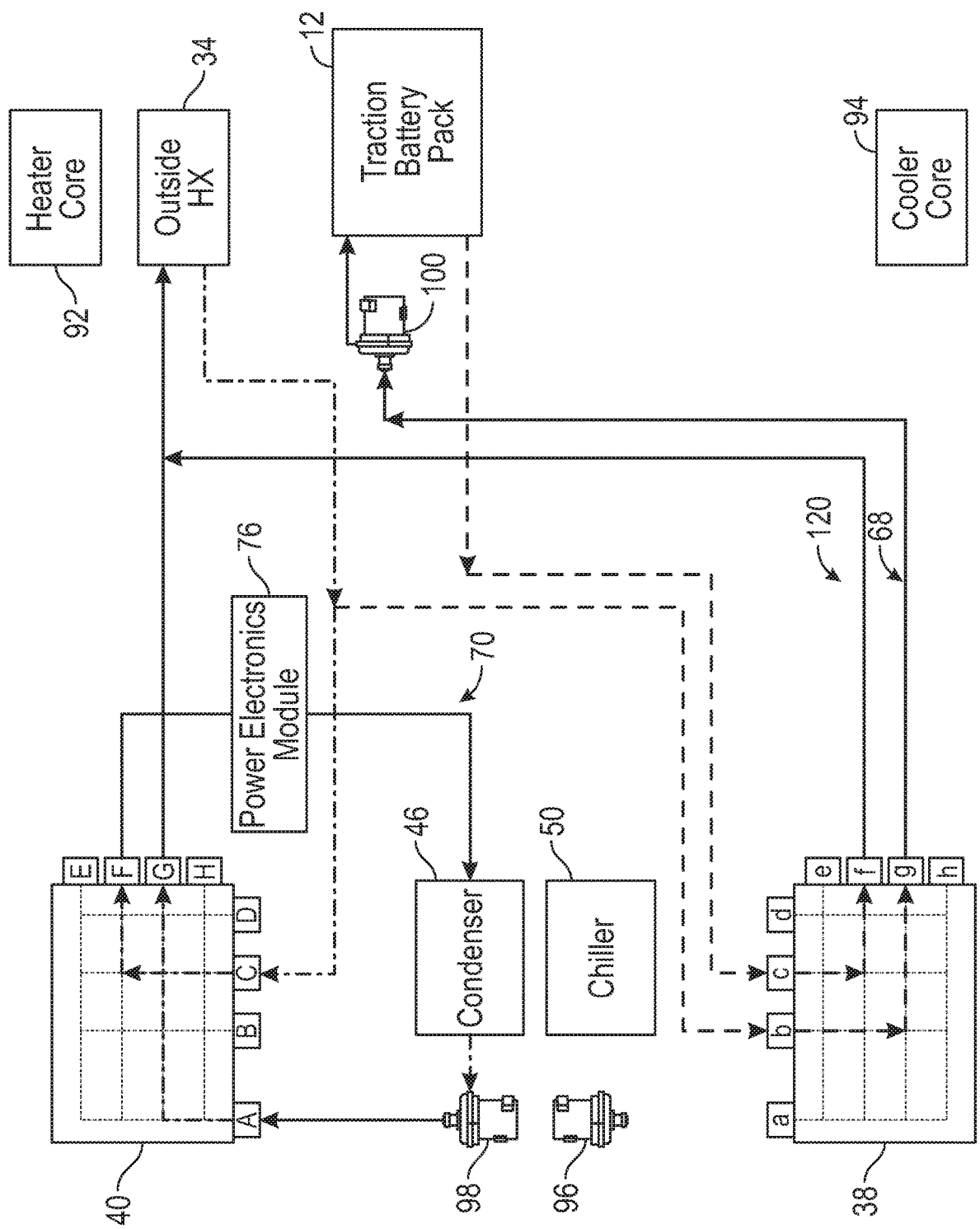
FIG. 33 schematically illustrates a twenty-fourth exemplary thermal control mode of an electrified vehicle integrated thermal management system.

FIG. 33 illustrates the twenty-fourth exemplary thermal control mode for passively cooling the traction battery pack 12 and for cooling the power electronics module 76 during a fault condition. During this mode, coolant C is circulated through the first battery circuit 68, the outside heat exchanger circuit 120, and the e-drive circuit 70.

Figure 34:
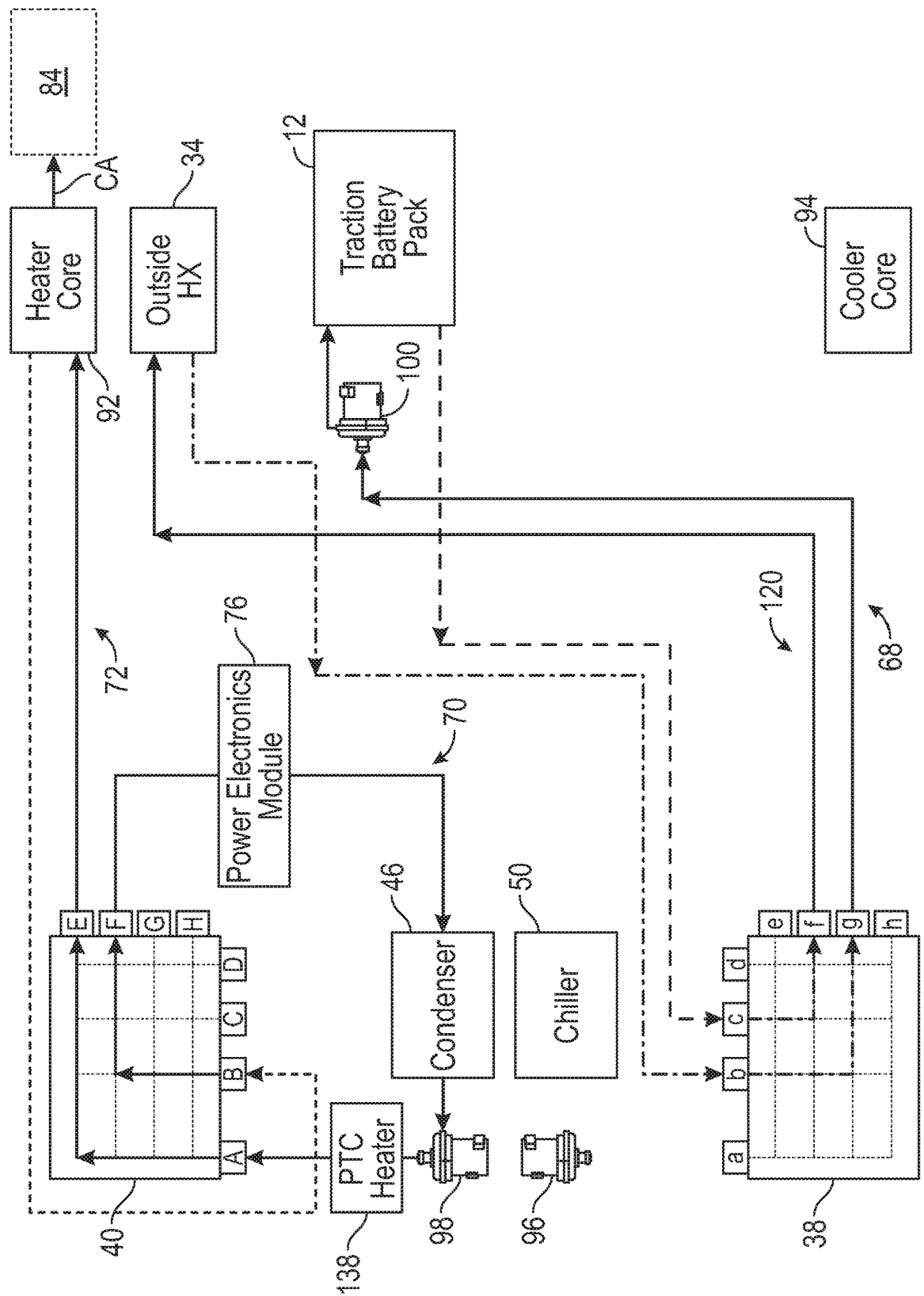
FIG. 34 schematically illustrates a twenty-fifth exemplary thermal control mode of an electrified vehicle integrated thermal management system.

FIG. 34 illustrates the twenty-fifth exemplary thermal control mode for passively cooling the traction battery pack 12, providing heat recovery for the power electronics module 76, and providing passenger cabin heating. During this mode, coolant C may be circulated through the first battery circuit 68 and the outside heat exchanger circuit 120 for passively cooling the traction battery pack 12, through portions of the e-drive circuit 70 (e.g., without passing through the radiator 34) for providing heat recovery within the power electronics module 76, and through the passenger cabin heating circuit 72 for heating the passenger cabin 84. The passenger cabin heating may be augmented during this thermal control mode by activating the PTC heater 138.

Figure 35:
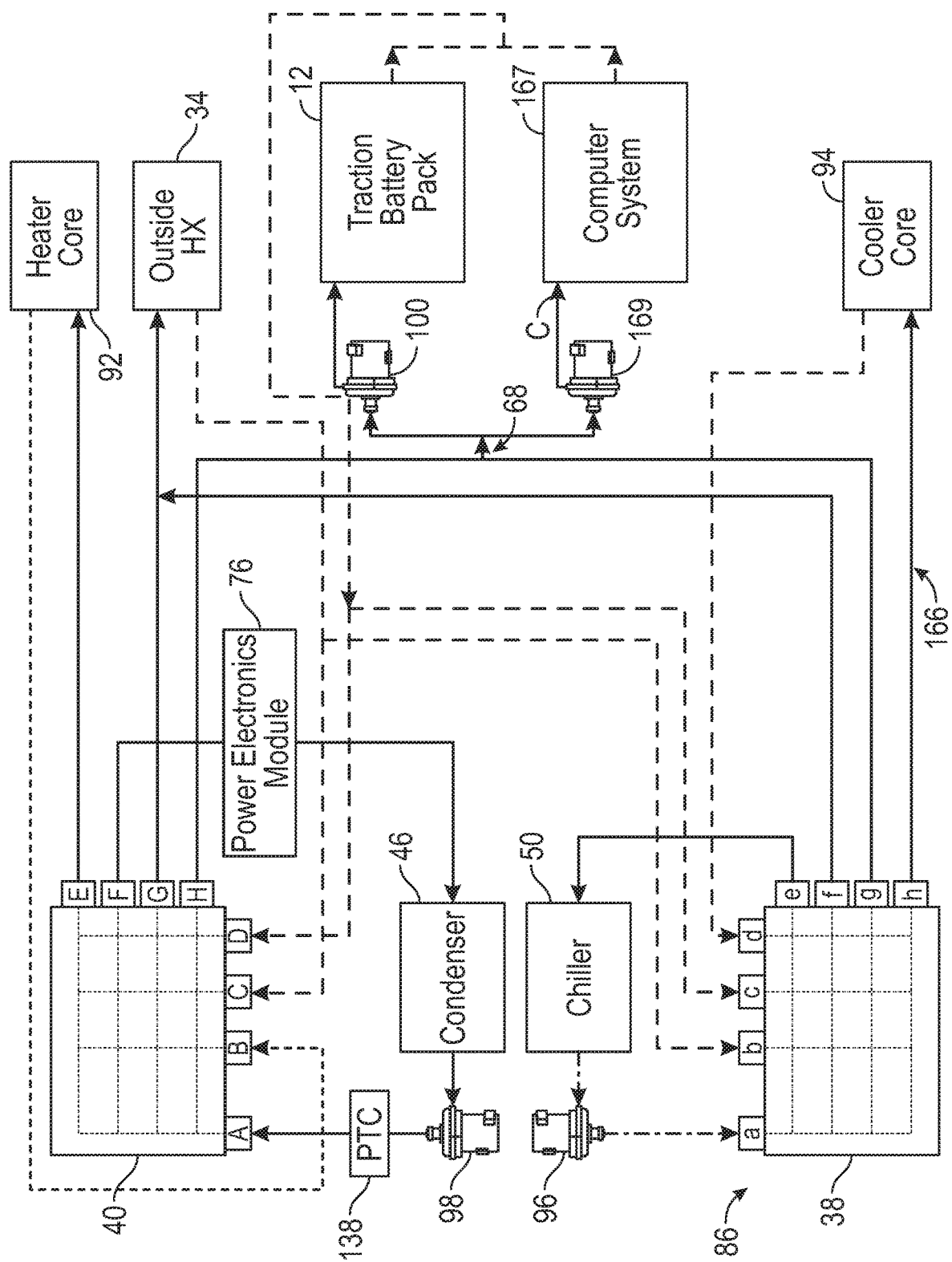
FIG. 35 schematically illustrates another integrated thermal management system for an electrified vehicle.

FIG. 35 schematically illustrates another exemplary integrated thermal management system 166 that can be employed within an electrified vehicle. The integrated thermal management system 166 is similar to the integrated thermal management system 66 of FIG. 9. However, in this embodiment, the integrated thermal management system 166 may additionally be configured to thermally manage a computer system 167, such as for an autonomous vehicle. The computer system 167 may be incorporated into the first battery circuit 68 of the coolant system 86. An additional pump 169 may pump the coolant C to the computer system 167 in series with the traction battery pack 12 for thermally managing both the computer system 167 at the same time as the traction battery pack 12.

Figure 36:
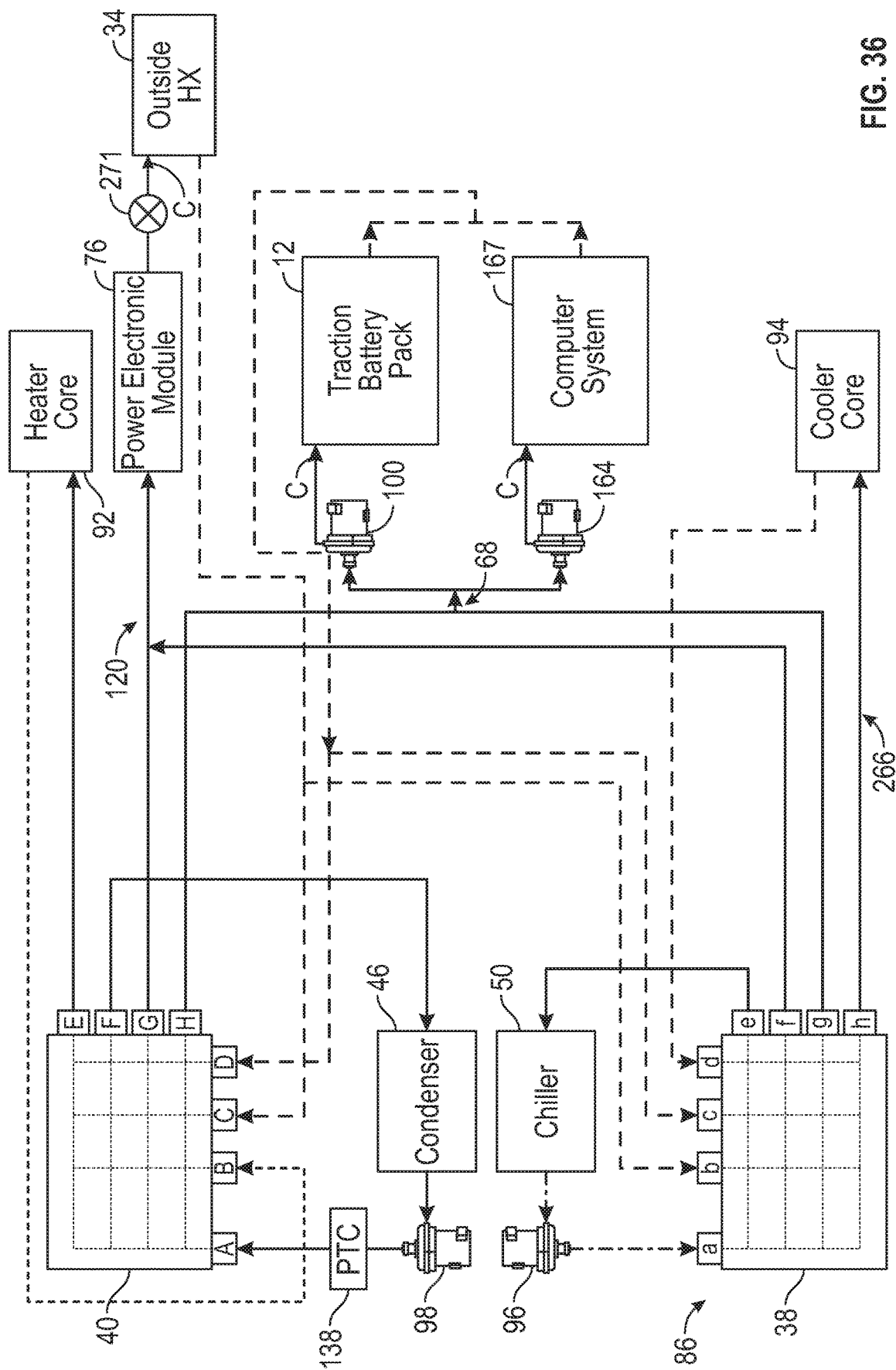
FIG. 36 schematically illustrates another integrated thermal management system for an electrified vehicle.
Figure 37:
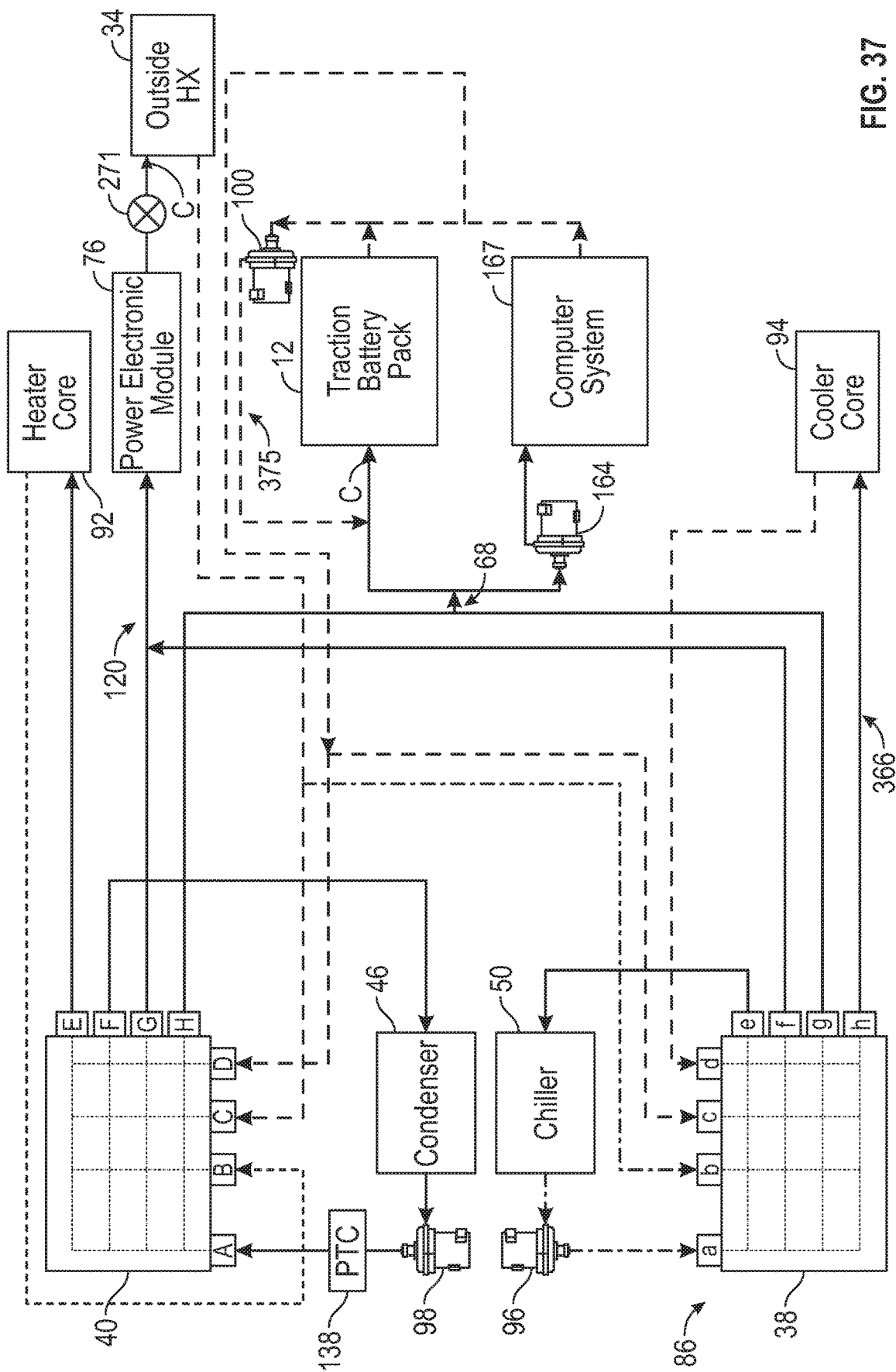
FIG. 37 schematically illustrates yet another integrated thermal management system for an electrified vehicle.

FIG. 36 schematically illustrates another exemplary integrated thermal management system 266 that can be employed within an electrified vehicle. The integrated thermal management system 266 is similar to the integrated thermal management system 166 of FIG. 35. However, in this embodiment, the power electronics module 76 is relocated upstream of the radiator 34 (i.e., as part of the outside heat exchanger circuit 120 of the coolant system 86). A controllable valve 271 may be positioned between the power electronics module 76 and the radiator 34. The controllable valve 271 may be actuated between ON and OFF positions to control the flow of the coolant to the radiator 34, thereby enhancing the heat pump efficiency of the integrated thermal management system 266.

FIG. 36 schematically illustrates yet another exemplary integrated thermal management system 366 that can be employed within an electrified vehicle. The integrated thermal management system 366 is similar to the integrated thermal management system 266 of FIG. 36. However, in this embodiment, the third pump 100 is relocated downstream of the traction battery pack 12 and is positioned within a recirculation loop 375 of the first battery circuit 68, thereby providing a more efficient coolant C temperature control at the inlet of the traction battery pack 12.

The exemplary integrated thermal management systems of this disclosure provide modular and scalable designs that can be dropped into a flexible modular platform to enable self-propelled platforms on the manufacturing floor during vehicle assembly. The modular designs may be provided in different sizes (e.g., small, medium, large) for simple integration across multiple vehicle product lines. The integrated thermal management systems may utilize a compact and efficient AC refrigerant system that can be pre-charged and sealed prior to delivery to the vehicle assembly plant, thereby significantly reducing labor and associated costs. The under-hood location of the thermal module assembly simplifies servicing and part replacement. Finally, the integrated thermal management systems enable the use of at least twenty-five thermal control modes for addressing all vehicle operating conditions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
   a flexible modular platform including a front end structure; and
   a thermal module assembly mounted to the front end structure,
   wherein the thermal module assembly includes an outside heat exchanger, a refrigerant system, a first manifold valve, and a second manifold valve.

2. The electrified vehicle as recited in claim 1, wherein the flexible modular platform includes an axle assembly that includes a pair of drive wheels and an electric machine configured to apply a rotational output torque to the axle assembly for driving the pair of drive wheels.

3. The electrified vehicle as recited in claim 1, wherein the front end structure is connected to a structural frame of the flexible modular platform, and further wherein the structural frame includes a plurality of rail members that include hollow passages.

4. The electrified vehicle as recited in claim 3, comprising a plurality of coolant lines integrated within the hollow passages, wherein at least a portion of the plurality of coolant lines are fluidly connected to the first manifold valve or the second manifold valve of the thermal module assembly.

5. The electrified vehicle as recited in claim 1, wherein the outside heat exchanger is a radiator received between upright frame members of the front end structure, and further wherein the radiator is positioned adjacent to a bumper rail of the front end structure.

6. The electrified vehicle as recited in claim 5, wherein the radiator includes a indented surface that accommodates a shape of the bumper rail.

7. The electrified vehicle as recited in claim 1, wherein the thermal module assembly is part of an integrated thermal management system of the electrified vehicle.

8. The electrified vehicle as recited in claim 7, wherein a coolant system of the integrated thermal management system includes the outside heat exchanger, the first manifold valve, the second manifold valve, a heater core, a cooler core, a traction battery pack heat exchanger, and an electric motor heat exchanger.

9. The electrified vehicle as recited in claim 8, wherein the refrigerant system includes a compressor, a condenser, a thermal expansion valve, and a chiller.

10. The electrified vehicle as recited in claim 9, wherein a coolant of the coolant system exchanges heat with a refrigerant of the refrigerant system within the condenser and the chiller.

11. The electrified vehicle as recited in claim 1, wherein the first manifold valve and the second manifold valve are each eight-way valves.

12. An integrated thermal management system for an electrified vehicle, comprising:
a refrigerant system configured to circulate a refrigerant and including a first refrigerant-to-coolant heat exchanger and a second refrigerant-to-coolant heat exchanger;
a coolant system configured to circulate a coolant through the first refrigerant-to-coolant heat exchanger, the second refrigerant-to-coolant heat exchanger, or both for exchanging heat with the refrigerant based on a thermal control mode of the integrated thermal management system, wherein:
a first circuit of the coolant system is configured to receive a first portion of the coolant for thermally managing a first electrified vehicle component;
a second circuit of the coolant system is configured to receive a second portion of the coolant for thermally managing a second electrified vehicle component;
a third circuit of the coolant system is configured to receive a third portion of the coolant for addressing a first auxiliary load of the electrified vehicle; and
a fourth circuit of the coolant system is configured to receive a fourth portion of the coolant for addressing a second auxiliary load of the electrified vehicle; and
a control unit configured to selectively control a flow of each of the first portion, the second portion, the third portion, and the fourth portion of the coolant based on the thermal control mode.

13. The system as recited in claim 12, wherein the first electrified vehicle component is a traction battery pack, the second electrified vehicle component is a power electronics module, the first auxiliary load is a passenger cabin heating load, and the second auxiliary load is a passenger cabin cooling load.

14. The system as recited in claim 13, wherein the traction battery pack includes a first internal cooling circuit for receiving the first portion of the coolant and the power electronics component includes an electric machine including a second internal cooling circuit for receiving the second portion of the coolant.

15. The system as recited in claim 12, wherein the first refrigerant-to-coolant heat exchanger is a condenser and the second refrigerant-to-coolant heat exchanger is a chiller, and further wherein the refrigerant system includes a compressor and a thermal expansion valve.

16. The system as recited in claim 12, wherein the coolant system includes a radiator, a first manifold valve, a second manifold valve, a heater core that is part of the third circuit, and a cooler core that is part of the fourth circuit.

17. The system as recited in claim 16, wherein the first manifold valve is fluidly connected to the first circuit and the fourth circuit and the second manifold valve is fluidly connected to the second circuit and the third circuit.

18. The system as recited in claim 16, wherein the radiator, the first manifold valve, the second manifold valve, and the refrigerant system establish a thermal module assembly that is integrated into a front end structure of a flexible modular platform of the electrified vehicle.

19. The system as recited in claim 18, wherein an integrated coolant line of a structural frame of the flexible module platform is fluidly connected to the thermal module assembly.

20. The system as recited in claim 12, wherein the first electrified vehicle component is a traction battery pack and a computer system.

* * * * *